(12) United States Patent
Takemura et al.

(10) Patent No.: US 10,685,449 B2
(45) Date of Patent: Jun. 16, 2020

(54) SURROUNDING ENVIRONMENT RECOGNITION DEVICE FOR MOVING BODY

(71) Applicant: HITACHI AUTOMOTIVE SYSTEMS, LTD., Hitachinaka-shi, Ibaraki (JP)

(72) Inventors: Masayuki Takemura, Tokyo (JP); Takeshi Shima, Tokyo (JP); Takeshi Nagasaki, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 178 days.

(21) Appl. No.: 16/061,207

(22) PCT Filed: Jan. 12, 2017

(86) PCT No.: PCT/JP2017/000703
§ 371 (c)(1),
(2) Date: Jun. 11, 2018

(87) PCT Pub. No.: WO2017/138286
PCT Pub. Date: Aug. 17, 2017

(65) Prior Publication Data
US 2018/0357772 A1    Dec. 13, 2018

(30) Foreign Application Priority Data
Feb. 12, 2016    (JP) .................................. 2016-025311

(51) Int. Cl.
*G06T 7/20*    (2017.01)
*B60R 1/00*    (2006.01)
(Continued)

(52) U.S. Cl.
CPC .................. *G06T 7/20* (2013.01); *B60R 1/00* (2013.01); *G06K 9/00369* (2013.01);
(Continued)

(58) Field of Classification Search
CPC ..................................................... G06T 7/20
(Continued)

(56) References Cited

U.S. PATENT DOCUMENTS

2006/0013480 A1    1/2006 Sano
2008/0199050 A1    8/2008 Koitabashi
(Continued)

FOREIGN PATENT DOCUMENTS

EP          1959675 A2    8/2008
JP       2004-086417 A    3/2004
(Continued)

OTHER PUBLICATIONS

International Search Report, PCT/JP2017/000703, dated Mar. 14, 2017, 2 pgs.
(Continued)

*Primary Examiner* — Yulin Sun
(74) *Attorney, Agent, or Firm* — Volpe and Koenig, P.C.

(57) ABSTRACT

The purpose of the present invention is to provide a surrounding environment recognition device such that even in a situation where a certain moving three-dimensional object is apparently overlapped with another three-dimensional object, early detection of the certain moving three-dimensional object is enabled. To this end, a surrounding environment recognition device for a moving body is equipped with: imaging units for photographing multiple images in a time series; a three-dimensional object detection unit for detecting three-dimensional objects on the basis of distances of the objects from the imaging units; a vector detection unit for tracking feature points within predetermined areas of the multiple images containing the three-dimensional objects, thereby detecting motion vectors of the feature points; and a moving three-dimensional object detection unit for detecting three-dimensional objects which are present in the areas on the basis of detection results of the vector detection unit.

13 Claims, 15 Drawing Sheets

(51) Int. Cl.
  *G08G 1/16* (2006.01)
  *G06K 9/00* (2006.01)
  *G06T 7/00* (2017.01)

(52) U.S. Cl.
  CPC ............ *G06K 9/00805* (2013.01); *G06T 7/00* (2013.01); *G08G 1/16* (2013.01)

(58) Field of Classification Search
  USPC ....................................................... 348/148
  See application file for complete search history.

(56) References Cited

U.S. PATENT DOCUMENTS

| | | | | |
|---|---|---|---|---|
| 2014/0037138 A1* | 2/2014 | Sato | ................. | G08G 1/166 382/103 |
| 2017/0098132 A1* | 4/2017 | Yokota | ................. | G06T 7/285 |

FOREIGN PATENT DOCUMENTS

| | | |
|---|---|---|
| JP | 2005-214914 A | 8/2005 |
| JP | 2006-031162 A | 2/2006 |
| JP | 2007-315814 A | 12/2007 |
| JP | 2008-203992 A | 9/2008 |
| JP | 2014-099028 A | 5/2014 |

OTHER PUBLICATIONS

Extended European Search Report dated Sep. 24, 2019 for the European Patent Application No. 17750011.3.
Japanese Office Action dated Oct. 4, 2019 for the Japanese Patent Application No. 2016-025311.
Nedevschi et al., "Stereo-Based Pedestrian Detection for Collision-Avoidance Applications," in IEEE Transactions on Intelligent Transportation Systems, vol. 10, No. 3, pp. 380-391, (Sep. 2009).

\* cited by examiner

115: THREE-DIMENSIONAL AREA

DETECT THREE-DIMENSIONAL OBJECT

Z DISTANCE = 20m
VERTICAL = 1.4m
LATERAL = 1.9m

ANALYZE MOVEMENT DIRECTION
IN THREE-DIMENSIONAL AREA

DETERMINE DEPTH-WISE DISTANCE (Z DISTANCE)
AND CALCULATE SIZE FROM PARALLAX

FIG. 18

ASSUME THAT PERSON IS STANDING NEAR AT Z DISTANCE

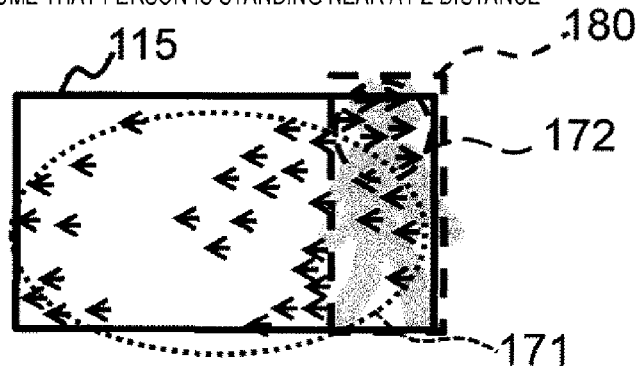

BASED ON GENERAL PEDESTRIAN SIZE, IT IS DETERMINED
WHETHER MOTION OF 30% OR MORE OF PERSON'S BODY IS VISUALLY RECOGNIZABLE

MOVING THREE-DIMENSIONAL OBJECT IS IDENTIFIED IN FOLLOWING CASES:
(1) ASSUMING MOVING THREE-DIMENSIONAL OBJECT IS PEDESTRIAN, IT IS DETERMINED THAT 30%
    OR MORE OF ENTIRE BODY OF PEDESTRIAN IS VISUALLY RECOGNIZABLE
(2) IT IS DETERMINED THAT (1) IS SATISFIED AND HEAD PORTION IS VISUALLY RECOGNIZABLE
(3) IT IS DETERMINED THAT (1) IS SATISFIED AND LEG PORTION IS VISUALLY RECOGNIZABLE

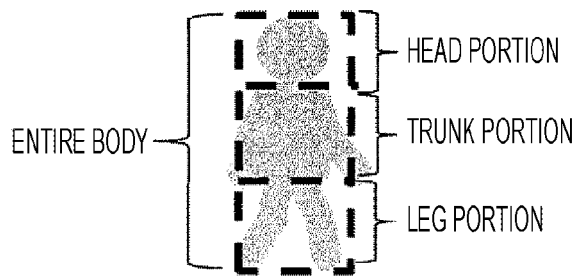

FIG. 19

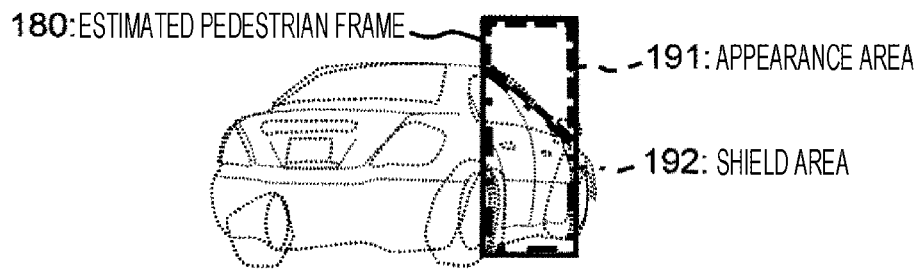

ESTIMATE APPEARANCE AREA AND SHIELD AREA OF APPROACHING MOVING BODY (PEDESTRIAN)

PARTIAL PATTERN MATCHING

FIG. 23

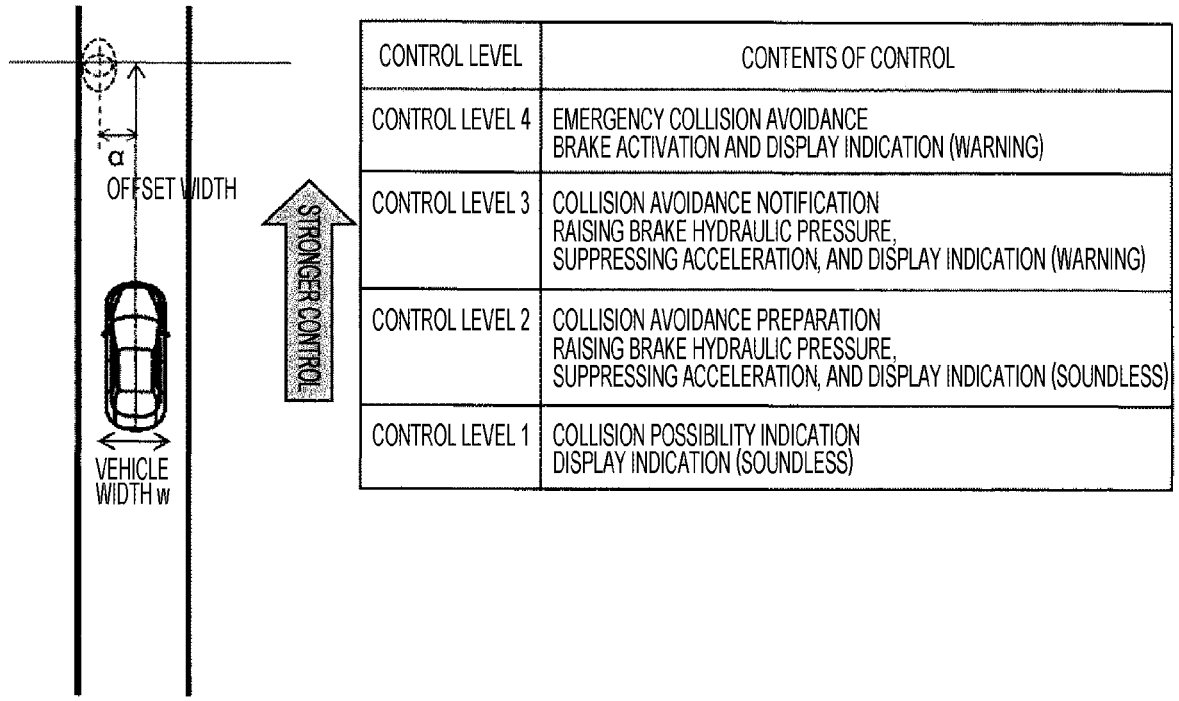

| CONTROL LEVEL | CONTENTS OF CONTROL |
|---|---|
| CONTROL LEVEL 4 | EMERGENCY COLLISION AVOIDANCE<br>BRAKE ACTIVATION AND DISPLAY INDICATION (WARNING) |
| CONTROL LEVEL 3 | COLLISION AVOIDANCE NOTIFICATION<br>RAISING BRAKE HYDRAULIC PRESSURE,<br>SUPPRESSING ACCELERATION, AND DISPLAY INDICATION (WARNING) |
| CONTROL LEVEL 2 | COLLISION AVOIDANCE PREPARATION<br>RAISING BRAKE HYDRAULIC PRESSURE,<br>SUPPRESSING ACCELERATION, AND DISPLAY INDICATION (SOUNDLESS) |
| CONTROL LEVEL 1 | COLLISION POSSIBILITY INDICATION<br>DISPLAY INDICATION (SOUNDLESS) |

FIG. 24

LATERAL POSITION IS MORE DISTANT FROM COLLISION COURSE →

| OFFSET WIDTH α  \   COLLISION-TIME POSITION ACCURACY | 0.0 TO HALF DEPTH OF VEHICLE (W/2) | W/2 TO W/2+0.3m | W/2+0.3m TO W/2+0.8m | W/2+0.8m TO W/2+0.8m +(TTC x tan1) |
|---|---|---|---|---|
| 1.0 OR LESS TO 0.8 OR MORE | CONTROL LEVEL 4 | CONTROL LEVEL 3 | CONTROL LEVEL 2 | CONTROL LEVEL 1 |
| LESS THAN 0.8 TO 0.6 OR MORE | CONTROL LEVEL 3 | CONTROL LEVEL 2 | CONTROL LEVEL 1 | |
| LESS THAN 0.6 TO 0.4 OR MORE | CONTROL LEVEL 2 | CONTROL LEVEL 1 | | |

↓ LOWER ACCURACY

SURROUNDING ENVIRONMENT RECOGNITION DEVICE FOR MOVING BODY

TECHNICAL FIELD

The present invention relates to a surrounding environment recognition device that detects three-dimensional objects existing in the surrounding environments of the surrounding environment recognition device.

BACKGROUND ART

There have been commercially introduced increasing numbers of applications for recognizing the vehicle surrounding environments by a camera mounted in a vehicle and devices equipped with the applications. In particular, it is expected that these products will be applied to preventive safety technologies for prevention of a contact with an object and vehicle control technologies for autonomous running, using the recognition results of surrounding environments. The application of the surrounding environment recognition products to these kinds of technologies require high reliability in the recognition of surrounding environments.

JP 2005-214914 A (PTL 1) discloses a technique for acquiring a pair of images by stereo cameras, detecting a three-dimensional object based on distance data obtained from the pair of images, and calculating the moving speed of the three-dimensional object based on an optical flow (motion vectors) of the three-dimensional object obtained from one of the pair of images.

CITATION LIST

Patent Literature

PTL 1: JP 2005-214914 A

SUMMARY OF INVENTION

Technical Problem

In the three-dimensional object detection based on the data about the distance between the subject vehicle and the object as described in PTL 1, when two three-dimensional objects exist at similar distances from the subject vehicle and they apparently overlap each other, the two three-dimensional objects may not be separately detected but may be detected as one three-dimensional object. In this case, the two three-dimensional objects can be differentiated from each other only after a lapse of a certain time since the two have apparently separated from each other.

Accordingly, in the case where a pedestrian passes just behind a parked vehicle in front of the subject vehicle and then is crossing over the running path of the subject vehicle, for example, the pedestrian and the parked vehicle are first detected as one three-dimensional object because the pedestrian and the parked vehicle apparently overlap each other, and then the pedestrian and the parked vehicle are independently detected only after the two apparently separate from each other. This results in a delay in the timing for discovering the pedestrian. Accordingly, the starting of control with the discovery of the pedestrian as a trigger (for example, control for avoidance of a contact between the subject vehicle and the pedestrian) is delayed.

An object of the present invention is to provide a surrounding environment recognition device that allows early detection of moving three-dimensional object even in a situation where the moving three-dimensional object and another three-dimensional object apparently overlap each other at a short distance including a situation where a pedestrian is running out from a blind area such as behind a parked vehicle.

Solution to Problem

To attain the foregoing object, in the present invention, a surrounding environment recognition device is equipped with: imaging units for photographing multiple images in a time series; a three-dimensional object detection unit for detecting three-dimensional objects on the basis of distances of the objects from the imaging units; a vector detection unit for tracking feature points within predetermined areas of the multiple images containing the three-dimensional objects, thereby detecting motion vectors of the feature points; and a moving three-dimensional object detection unit for detecting three-dimensional objects which are present in the areas on the basis of detection results of the vector detection unit.

Advantageous Effects of Invention

According to the present invention, it is possible to detect early moving three-dimensional objects in three-dimensional object detection based on distance.

BRIEF DESCRIPTION OF DRAWINGS

FIG. 18 is a diagram illustrating an example of a process by a geometrical check unit.

FIG. 19 is an illustrative diagram of a pedestrian pattern appearance area and a shield area.

FIG. 23 is a diagram illustrating an example of a contort level table showing the contents of controls at individual control levels.

FIG. 24 is a diagram illustrating an example of a control level determination table based on predicted position accuracy and offset width.

DESCRIPTION OF EMBODIMENTS

An example of the present invention will be described below with reference to the drawings. In all the drawings, the same components are given the same reference signs.

Hereinafter, an example of an automobile equipped with a surrounding environment recognition device (in-vehicle environment recognition device) will be described. However, the surrounding environment recognition device is applied not only to automobiles but is also applicable to various moving bodies such as construction machinery, robots, and agricultural machinery, and is further applicable to monitoring systems using camera images.

<FIG. 1>

Figure 1:
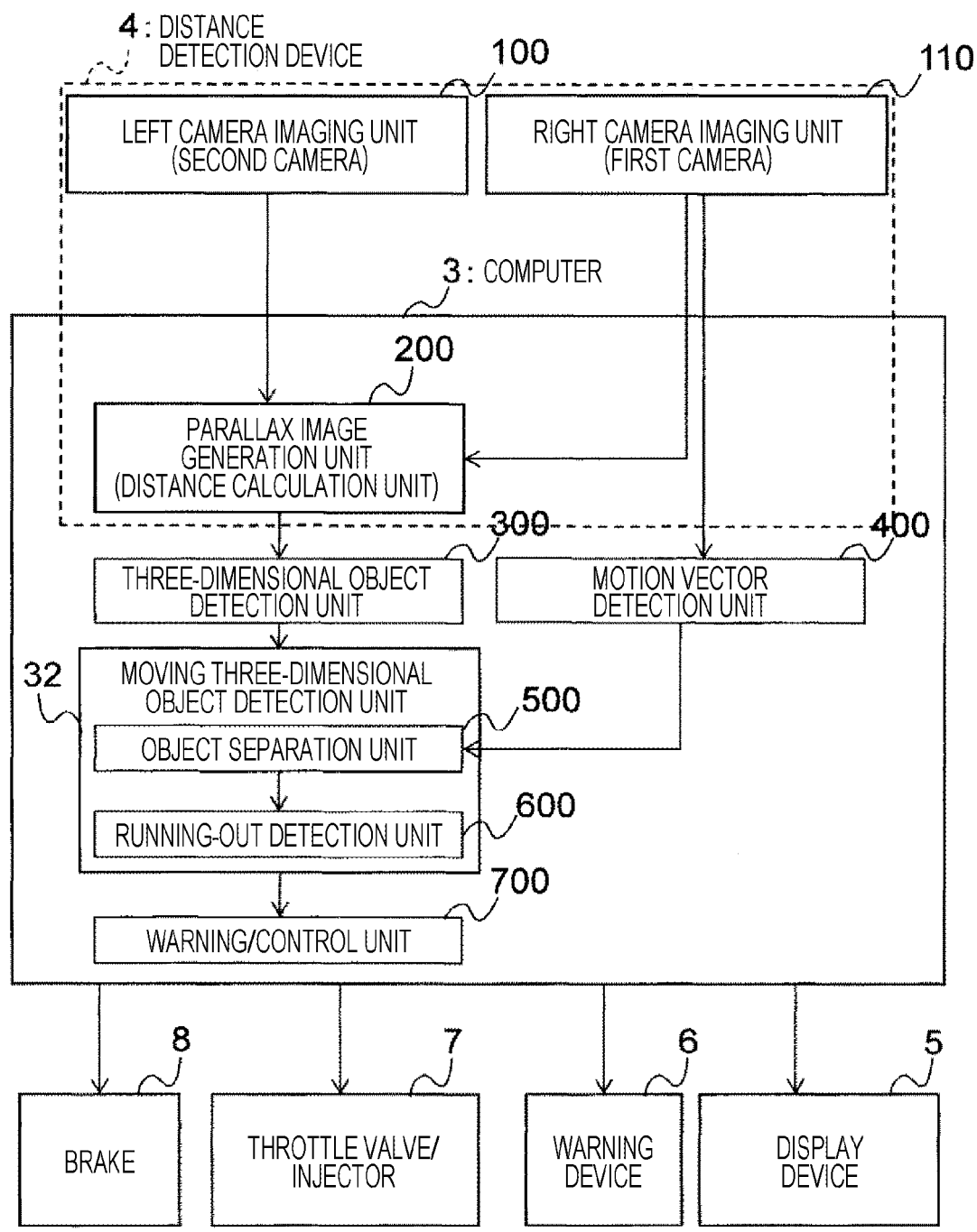
FIG. 1 is a schematic configuration diagram of an in-vehicle environment recognition device.

FIG. 1 illustrates a configuration of an in-vehicle environment recognition device. The in-vehicle environment recognition device includes a right camera imaging unit 110 built in a right camera (first camera) mounted on the right as seen from the front of the vehicle, a left camera imaging unit 100 built in a left camera (second camera) mounted on the left as seen from the front of the vehicle, a computer 3, a display device (display) 5 and a warning device 6 mounted in an interior of the vehicle, a throttle valve (intake control device) and injector (fuel injection device) 7 as an acceleration control device of the vehicle, and a brake 8.

The computer 3 includes an arithmetic control device (for example, CPU), a storage device (for example, memory, hard disk, and flash memory), and a communication device, which are not illustrated. The computer 3 serves as a parallax image generation unit (distance calculation unit) 200, a three-dimensional object detection unit 300, a motion vector detection unit (vector detection unit) 400, a moving three-dimensional object detection unit 32, and a warning/control unit 700. The moving three-dimensional object detection unit 32 serves as an object separation unit 500 and a running-out detection unit 600.

The right camera imaging unit 110 and the left camera imaging unit 100 constitute stereo cameras, each of which photographs a plurality of images of an area in front of the subject vehicle in a time series to acquire motion pictures. Although described later in detail, the imaging frame rate of the right camera imaging unit 110 (right camera) is higher than that of the left camera imaging unit 100 (left camera) (see FIG. 14).

The parallax image generation unit 200 generates a parallax image using a pair of images photographed by the right camera imaging unit 110 and the left camera imaging unit 100 at the same timing, and calculates the distances from the right camera imaging unit 110 and the left camera imaging unit 100 (subject device) to individual objects in the images based on the parallax image. The camera on which the generation of the parallax image is based can be selected as appropriate. For example, the parallax image is generated based on the right camera when stereo matching is performed to search the image of the left camera for matching points based on the image of the right camera.

Based on the distances calculated by the parallax image generation unit 200, the three-dimensional object detection unit 300 detects three-dimensional objects in the image at the timing for calculation of the distances. Accordingly, when a plurality of three-dimensional objects lies in a line in the front-back or side-to-side direction at similar distances (for example, an three-dimensional object exists right behind another three-dimensional object), the plurality of three-dimensional objects may be recognized as one three-dimensional object by the three-dimensional object detection unit 300. The three-dimensional object detection unit 300 sets a predetermined area including the outline of the detected three-dimensional object (hereinafter, also called "three-dimensional area") in the image of the left camera. The three-dimensional area can also be set in the image of the right camera. In the example, a rectangle circumscribing the outline of the detected three-dimensional object is set as three-dimensional area (for example, see FIG. 11, reference sign 115 described later). However, there is no particular limitation on the three-dimensional area as far as it is shaped to contain the entire outline of the detected three-dimensional object (for example, an outward expansion or extension of the outline of the three-dimensional object).

The motion vector detection unit 400 tracks feature points included in the three-dimensional area in the moving image of the right camera (specifically, a plurality of images constituting the moving image) in a time series to detect motion vectors indicating the movement directions and amounts of the feature points. Although there is no limitation on the number of feature points to be tracked, tracking a larger number of feature points is frequently advantageous from the viewpoint of detecting accurately a moving three-dimensional object. It is preferred to track all significant feature points that are detectable in the three-dimensional area. In tracking the feature points, motion vectors are detected by detecting the amount of lateral movement of vertical edges. Accordingly, the directions of the motion vectors are laterally simplified. The merits of tracking the vertical edges will be described later. Besides the vertical edge pattern, feature patterns with edges other than vertical edges and corners can be used. In addition, when the outline of the three-dimensional object detected by the three-dimensional object detection unit 300 is extractable, motion vectors may be detected by tracking feature points within the outline or partially within the outline, instead of the three-dimensional area.

The moving three-dimensional object detection unit 32 (the object separation unit 500 and the running-out detection unit 600) detects a moving three-dimensional object existing in the three-dimensional area based on the result of the detection by the motion vector detection unit 400.

Figure 10:
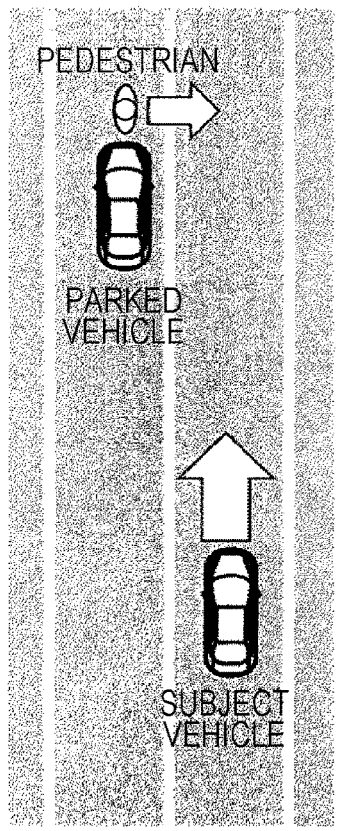
FIG. 10 is an overhead view of a scene of a pedestrian's running-out.
Figure 11:
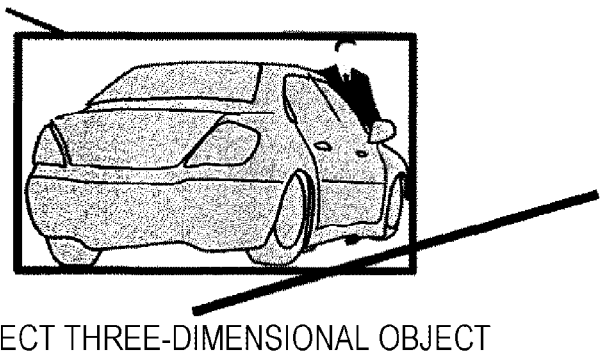
FIG. 11 is a diagram illustrating an example of an image of a scene of a pedestrian's running-out captured by the subject vehicle's camera.

The object separation unit 500 analyzes the motion vectors of the feature points existing in the three-dimensional area detected by the three-dimensional object detection unit 300, using the result of the three-dimensional object detection by the three-dimensional object detection unit 300 and the motion vectors detected by the motion vector detection unit 400. When one three-dimensional object is detected by the three-dimensional object detection unit 300, the motion vectors in the three-dimensional object generally include noise factors but are aligned in one direction except for the case where the three-dimensional object is in front of the subject vehicle. Meanwhile, assuming that there exists a plurality of objects in the three-dimensional area detected by the three-dimensional object detection unit 300, that is, a pedestrian as illustrated in FIGS. 10 and 11 partially hidden behind a parked vehicle is running out. In this case, the depth-wise distance between the pedestrian and the vehicle (the distance from the subject vehicle as seen in the traveling direction of the subject vehicle) is relatively short as illustrated in the upper part of the overhead view of FIG. 10. Accordingly, as the result of the three-dimensional object detection, the three-dimensional object detection unit 300 does not separate the pedestrian and the vehicle but detects them as one large three-dimensional object. Accordingly, when a rectangle circumscribing the detected three-dimensional object (detected three-dimensional object) is set as a three-dimensional area, a rectangle circumscribing the pedestrian and the vehicle constitutes a three-dimensional area 115 as illustrated in FIG. 11.

Figure 12:
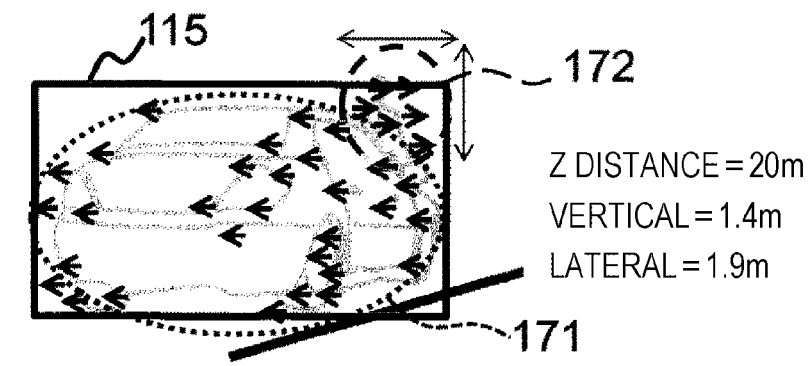
FIG. 12 is a diagram illustrating an example of motion vector distribution and an example of grouping the motion vectors having the distribution.

FIG. 12 illustrates the analysis result of the motion vectors in the three-dimensional area 115 illustrated in FIG. 11. In the moving image of the right camera, the parked vehicle apparently moves to the left as the subject vehicle approaches. Accordingly, the feature points of the parked vehicle have motion vectors moving leftward as illustrated in FIG. 12. In contrast, the pedestrian running out from behind the parked vehicle moves toward the center of the image (as seen in the traveling direction of the vehicle) in the moving image of the right camera. Accordingly, the feature points of the pedestrian are detected as a rightward vector group.

In this way, when a moving three-dimensional object exists in the three-dimensional area 115 of the detected three-dimensional object, a plurality of distribution trends is observed in the motion vectors. Accordingly, grouping the feature points focusing on the distributions of the motion vectors allows the detection of the moving three-dimensional object and the separation of the moving three-dimensional object from the detected three-dimensional object (specification of the image portion relating to the moving three-dimensional object). Therefore, even when a moving three-dimensional object and another three-dimensional object overlap each other at a short distance in the image, the moving three-dimensional object can be early detected. The detection of a moving three-dimensional object by the object separation unit 500 is particularly effective when a plurality of three-dimensional objects exists in the three-dimensional area 115 of the detected three-dimensional object. That is, this is the case where a plurality of three-dimensional objects exists in the three-dimensional area 115 of the detected three-dimensional object and at least one of the plurality of three-dimensional objects is detected as a moving three-dimensional object.

For the moving three-dimensional object (for example, a running-out pedestrian candidate) detected by the object separation unit 500, the running-out detection unit 600 determines the type of the moving three-dimensional object (pedestrian, two-wheel vehicle, or animal) by subjecting only part of the moving three-dimensional object appearing in the image (in other words, the three-dimensional area) to pattern matching (partial pattern matching).

A warning/control unit 700 calculates the risk and timing of a collision with the subject vehicle in accordance with the detected position and speed and the behavior of the subject vehicle. Then, the warning/control unit 700 issues a warning from the display device 5 and the warning device 6, controls the emergency brake by the brake 8, or controls the acceleration by the throttle valve/injector 7, depending on the time before a collision with the moving three-dimensional object.

Figure 2:
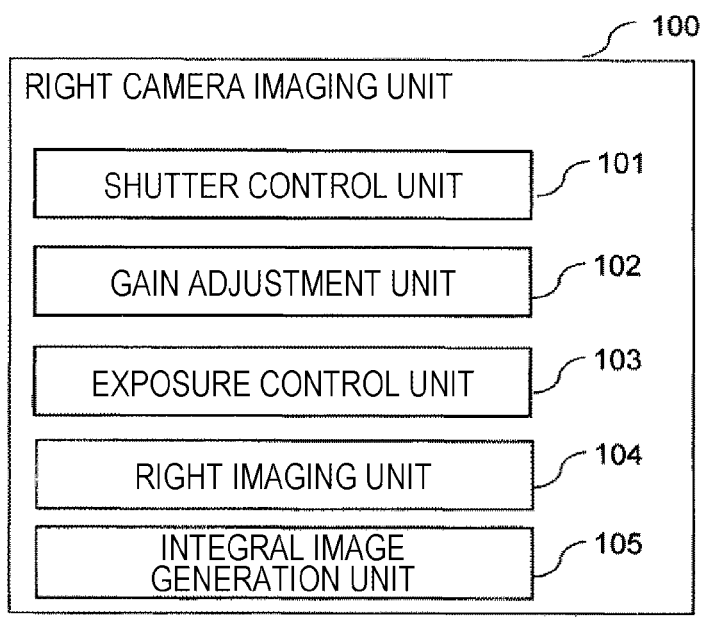
FIG. 2 is a schematic configuration diagram of a right camera imaging unit.
Figure 3:
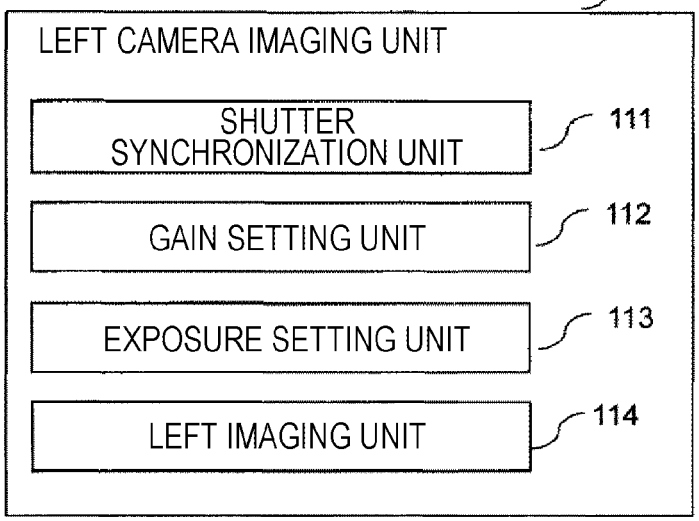
FIG. 3 is a schematic configuration diagram of a left camera imaging unit.

<FIGS. 2 and 3>

Figure 13:
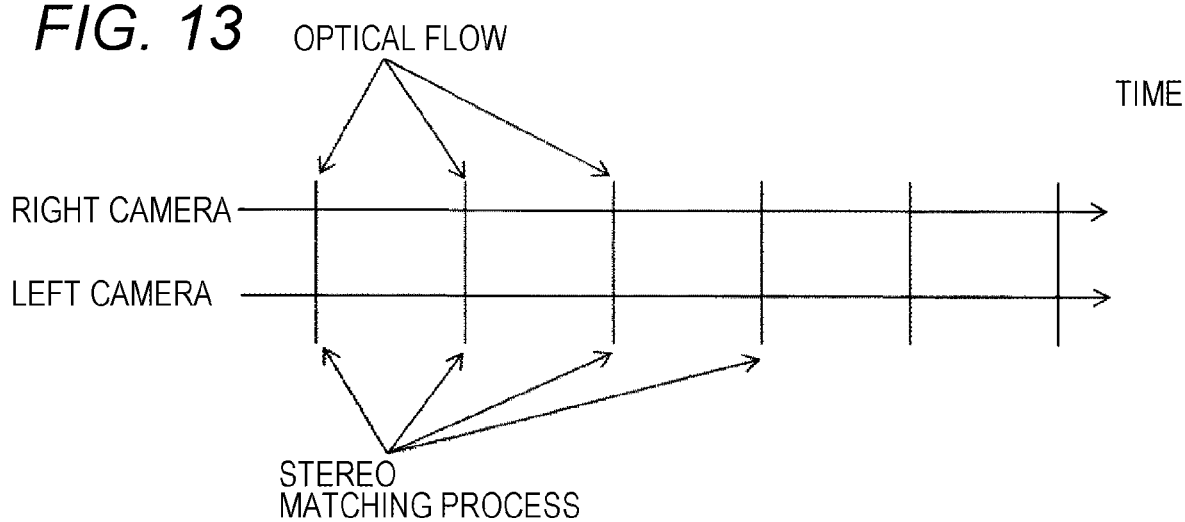
FIG. 13 is a time table of imaging by stereo cameras at the same frame rate.

FIG. 2 illustrates a configuration of the right camera imaging unit 110, and FIG. 3 illustrates a configuration of the left camera imaging unit. In adoptable configurations of the right and left cameras, the right and left cameras are the same in specifications and only the shutter control for adjusting the imaging timings of the right and left cameras is required. According to these configurations, as illustrated in FIG. 13, the right and left cameras' shutters release at the same imaging timing. This makes it possible to generate a parallax image with high accuracy from the simultaneously captured images from the two viewpoints.

Figure 14:
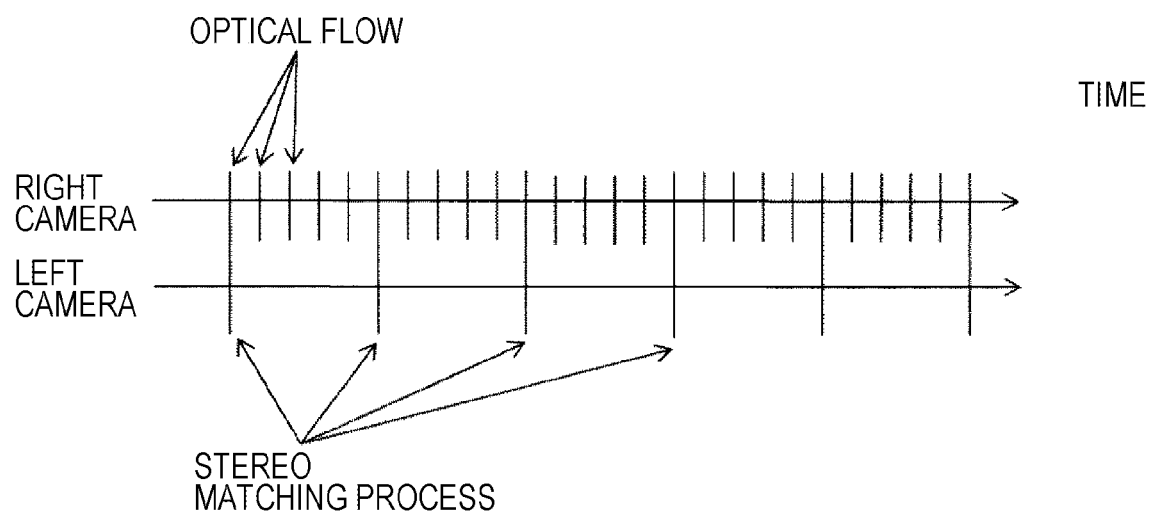
FIG. 14 is a time table of imaging by stereo cameras (monocular high-speed cameras) at different frame rates.

Used In the example is a system configuration in which unsymmetrical shutter timings are controlled as illustrated in FIG. 14. The right camera is used as a base camera in stereo matching and extracts motion vectors. The right camera photographs an image at a frame rate five times higher than the left camera (100 fps in this case) and the left camera photographs an image at 20 fps. The right and left cameras serve as stereo cameras at 20 fps at the matched imaging timings. The right camera uses the image captured at the high frame rate to extract motion vectors. Using the images at the high frame rate allows the calculation of motion vectors by matching in a narrowed search range due to few changes in the image between frames. Accordingly, erroneous matching can be reduced even by a simpler method to allow accurate calculation of motion vectors at high density.

Referring to FIG. 2, the right camera imaging unit 110 includes a shutter control unit 101, a gain adjustment unit 102, an exposure control unit 103, a right imaging unit 104, and an integral image generation unit 105.

Referring to FIG. 3, the left camera imaging unit 100 includes a shutter synchronization unit 111, a gain setting unit 112, an exposure setting unit 113, and a left imaging unit 114.

The right camera imaging unit 110 performs the exposure adjustment, shutter control, and imaging of the right camera. As illustrated in FIG. 14, the left camera performs imaging once while the right camera performs imaging five times in accordance with the shutter timing of the right camera. The shutter control unit 101 (see FIG. 2) controls the shutter of the right camera, and the shutter synchronization unit 111 (see FIG. 3) controls the shutter of the left camera in accordance with the shutter timing of the right camera. Next, the gain adjustment unit 102 and the exposure control unit 103 perform gain adjustment and exposure control with reference to the average luminance value in the exposure area of the image in the previous frame captured by the right imaging unit 104. With reference to the setting values of gain and exposure in the right camera, the gain setting unit 112 and the exposure setting unit 113 of the left camera set the same values to the left camera because the right and left cameras basically need to capture images at the equal luminance value. Accordingly, the shutters of the right and left camera release simultaneously at 20 fps at the same gain, under the same exposure control, and at the same timing to capture images by the right imaging unit 104 and the left imaging unit 114. The right camera photographs at a high frame rate, and thus may be improved in recognition performance at night or in dark places by using an integral image of the captured images obtained from the integral image generation unit 105. In particular, the integral image may be used to improve image contrast for recognition of headlights and tail lamps of distant vehicles, white lines outside the area illuminated by the headlights, and road signs which would be recognized by monocular processing in the night-time.

<FIG. 4>

Figure 4:
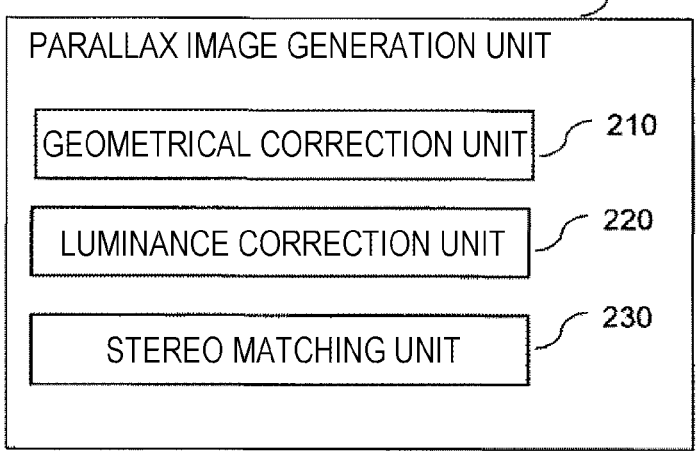
FIG. 4 is a schematic configuration diagram of a parallax image generation unit.

Referring to FIG. 4, the parallax image generation unit 200 includes a geometrical correction unit 210, a luminance correction unit 220, and a stereo matching unit 230. The parallax image generation unit 200 performs stereo matching of the images captured by the left camera imaging unit 100 and the images captured by the right camera imaging unit 110. As illustrated in FIG. 14, when the imaging period of the right camera is shorter than that of the left camera (the frame rate is higher), the parallax image generation unit 200 performs stereo matching of only the images with a coincidence of imaging period between the right camera and the left camera. First, the original images captured by the right and left cameras are not yet corrected in distortion or sensitivity varying depending on the position in the image.

Accordingly, as a step of the production process of stereo cameras, the geometrical correction unit 210 corrects the distortion in lenses of the right and left cameras through geometrical calibration performed by imaging a geometrical chart, and reads a geometrical correction table for bringing the images of the right and left cameras into a parallel relationship to make geometrical corrections to the right and left cameras. Accordingly, the images of the right and left cameras having undergone the geometrical correction are in a parallel relationship and are free of lens distortion. This makes it possible to prepare the right and left images likely to match geometrically. Next, as a step of the production process of the stereo cameras, the luminance correction unit 220 performs luminance correction using a luminance correction table as results of the sensitivity calibration by which to measure the level of sensitivity varying depending on the position in the image. Accordingly, the right and left cameras coincide in sensitivity, and the right and left cameras can capture images at almost equal luminance at any position by correction. The right and left sensitivities are almost equal in the stereo matching of the right and left cameras, which leads to increase in matching accuracy. The images of the right and left cameras are corrected through the image distortion correction by the geometrical correction unit 210 and the luminance correction by the luminance correction unit 220, and the corrected images are used to perform stereo matching by the stereo matching unit 230. This allows generation of a high-accuracy and high-density parallax image.

<FIG. 5>

Figure 5:
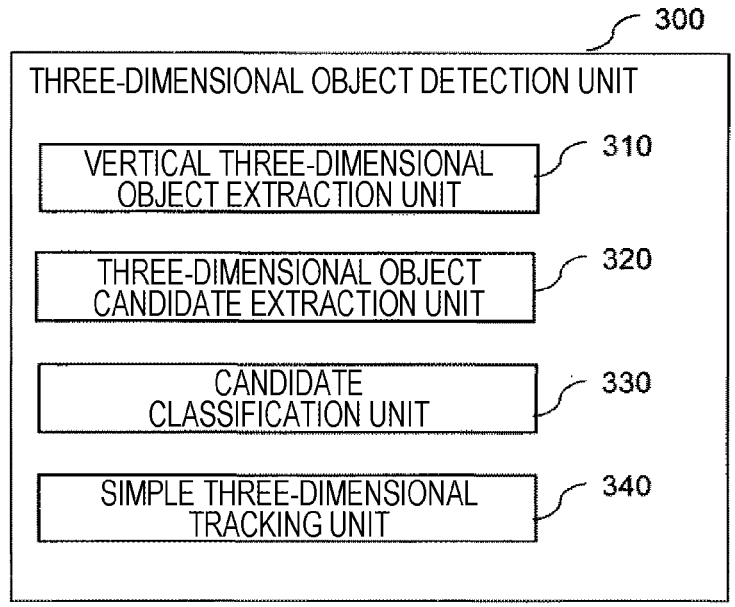
FIG. 5 is a schematic configuration diagram of a three-dimensional object detection unit.

Referring to FIG. 5, the three-dimensional object detection unit 300 includes a vertical three-dimensional object extraction unit 310, a three-dimensional object candidate extraction unit 320, a candidate classification unit 330, and a simple three-dimensional tracking unit 340. The three-dimensional object detection unit 300 performs three-dimensional object detection using the parallax image acquired by the parallax image generation unit 200. The vertical three-dimensional object extraction unit 310 first detects vertical objects existing at equal depth-wise distance (distance from the subject vehicle as seen in the traveling direction of the subject vehicle) as a mass, in the vertical direction of the parallax image. Among the vertical objects, ones existing perpendicularly downward in the real world at the height of a road surface or below the road surface are excluded from the target vertical three-dimensional objects, or parts of them near the road surface are cut out so that they are set as vertical three-dimensional object candidates. Next, the three-dimensional object candidate extraction unit 320 examines lateral links between the vertical three-dimensional objects to determine whether the widths and heights of the three-dimensional objects are equal to or more than predetermined values. When determining that the widths and heights are equal to or more than the predetermined values, the three-dimensional object candidate extraction unit 320 extracts the three-dimensional object candidates.

Next, the candidate classification unit 330 classifies the three-dimensional object candidates by size. The three-dimensional object candidate that is possibly a pedestrian in size is flagged as a pedestrian candidate, and the three-dimensional object candidate that is possibly a vehicle in size is flagged as a vehicle candidate. Similarly, the categories of candidate classification may include two-wheel vehicle (bicycle and motorcycle), truck, road sign, animal (deer, cow, horse, and others) from the viewpoint of enabling identification of various three-dimensional objects.

Next, the simple three-dimensional tracking unit 340 tracks the three-dimensional object candidates. In tracking, the simple three-dimensional tracking unit 340 sets a search range taking the movement amount of the subject vehicle behavior (that is, the speed of the subject vehicle) into account. If the speed of the three-dimensional object is unknown, when the three-dimensional object is a pedestrian candidate, the simple three-dimensional tracking unit 340 assumes the movement speed of the pedestrian as ±12 km/h or less and corrects the same with the speed relative to the subject vehicle. The simple three-dimensional tracking unit 340 then searches for the past and current correspondence of the three-dimensional object and tracks the same in the foregoing range. When the speed of the three-dimensional object is predictable by the information from the motion vector 400 unit, the speed information and the subject vehicle behavior information are combined to decide the tracking search range, and the tracking is performed.

<FIG. 6>

Figure 6:
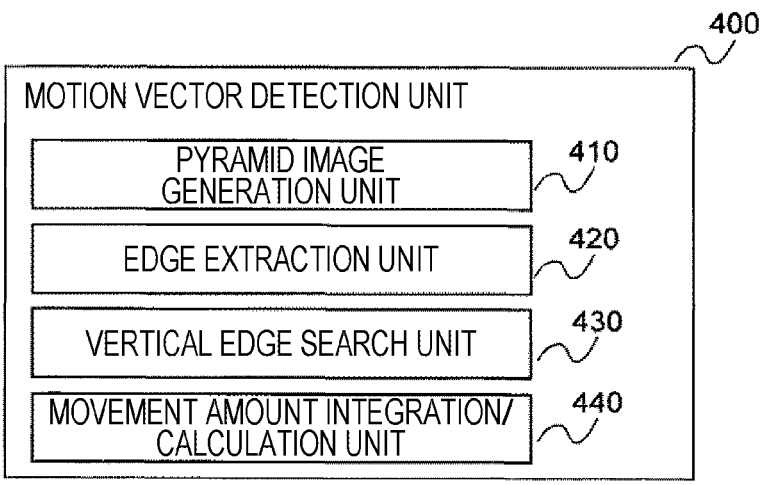
FIG. 6 is a schematic configuration diagram of a motion vector detection unit.

Referring to FIG. 6, the motion vector detection unit 400 includes a pyramid image generation unit 410, an edge extraction unit 420, a vertical edge search unit 430, and a movement amount integration/calculation unit 440. The motion vector detection unit 400 searches for the movement amount of vertical-direction edges (also called vertical edges) in the image. A method such as optical flow has an algorithm under which the feature points of dots (corners) forming the corners of an object are tracked. Accordingly, even when the movement amount in the image is large, tracking is unlikely to be lost or missed. This method is applicable to the example as well.

The method for calculating motion vectors in the example is based on an in-vehicle camera-specific concept that the background flows outside the right and left view fields along with the running of the vehicle. Since the background basically flows outside the view field of the screen, a still three-dimensional object in the background basically flows out onto the right or left side of the screen. Considering the nature of the background flowing in the lateral direction, the vertical edges of a still three-dimensional object flow outside the screen. In addition, a moving three-dimensional object moving on a road surface in the real world moves only in the rightward and leftward directions in the image. Accordingly, a moving three-dimensional object can be tracked based on the matching of images from in-vehicle cameras by tracking the movement of the vertical edges in the images. In addition, the movement of vertical edges can be tracked by searching for the vertical edges only in the lateral direction. However, it is to be noted that it is likely to occur erroneous tracking of distant vertical edges that are small in feature amount.

In the example, a pyramid image generation unit 410 is included to generate pyramid images as an assembly of the same images with different resolutions to limit the matching search range in the area with the presence of vertical edges. The pyramid image generation unit 410 of the example generates images (reduced images) obtained by reducing gradually an image captured by the right camera imaging unit 110 (original image) to predetermined resolutions (for example, ½ and ¼ of the original image). The pyramid images are formed from the original image and a plurality of the same reduced images.

Figure 15:
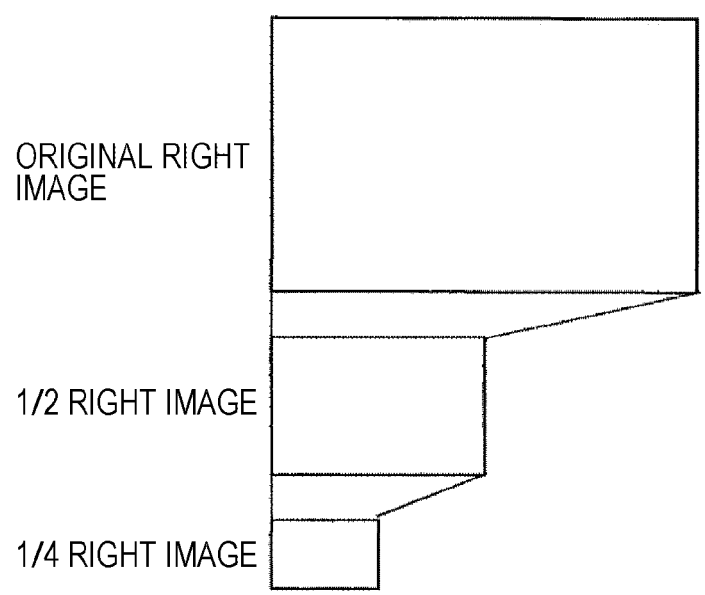
FIG. 15 is an illustrative diagram of pyramid images.

Respective units 420, 430, and 440 described later of the motion vector detection unit 400 can perform matching of vertical edges among the images of the same resolution generated by the pyramid image generation unit 410 to track the movement of the three-dimensional object relating to the vertical edges. As for an object imaged in the vicinity of a camera (an apparently large-sized object in the image) and an object greatly moving in the lateral direction in the image, the reduced image is searched for the vertical edges in the lateral direction. Accordingly, even though the search range in one image is fixed to five pixels or the like and equal to those in the other images captured at different times, when a movement amount of five pixels is detected in a ½-resolution reduced image, a movement amounts of ten pixels can be detected in the full-resolution image (original image). Similarly, when a movement amount of five pixels is detected in a ¼-resolution reduced image, a movement amount of 20 pixels can be detected in the original image. To decrease the search range, performing the tracking of the vertical edges using the pyramid images generated by the pyramid image generation unit 410 as illustrated in FIG. 15 allows high-accuracy tracking of featureless lines without making errors. In this case, the pyramid images with resolutions of an integral submultiple is generated. However, the reduction scale may not be necessarily an integral submultiple.

Figure 16:
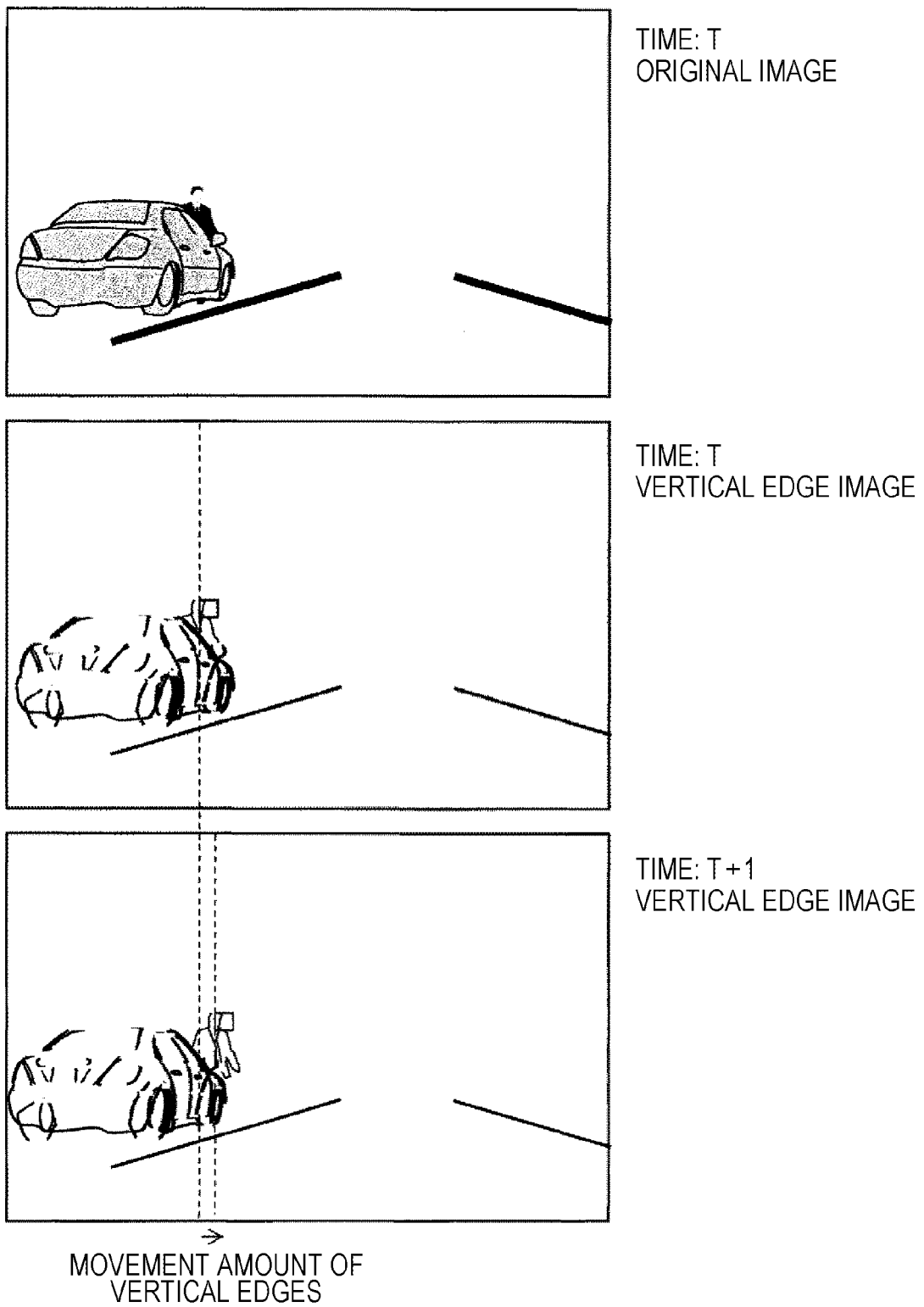
FIG. 16 is an illustrative diagram of vertical edge images and movement search.

The edge extraction unit 420 extracts vertical edges from the images with multiple resolutions generated by the pyramid image generation unit 410. Vertical edge images are generated for all the generated pyramid images with the plurality of resolutions. As illustrated in FIG. 16, the vertical edges are generated from the acquired original image. This operation is performed on the images with the plurality of resolutions generated by the pyramid image generation unit 410.

Next, the vertical edge search unit 430 compares the previous edge image (for example, the image at time T) with the current edge image (for example, the image at time T+1 one frame after time T) with the same resolution (size) as illustrated in the lower part of FIG. 16. Then, based on a small rectangular area in the image at time T+1 (see FIG. 16), the vertical edge search unit 430 searches the image at time T for an area similar in feature to the small rectangular area in the lateral direction of the image. Based on the lateral position in the image at time T+1, the vertical edge search unit 430 searches only a predetermined width in the horizontal direction. Accordingly, for an object with small motion in the image, there exists some matching position as illustrated in FIG. 16. Accordingly, the vertical edge search unit 430 can extract the possible movement amount of the object in the image for one frame. Meanwhile, for an object with large motion in the image (the movement amount is large), the relevant portion may fall outside the matching search range (predetermined width), which makes matching impossible. In such a case, ½- and ¼-resolution pyramid images as illustrated in FIG. 15 are searched for the object. For example, for an object at a short distance or an object laterally moving at a high speed, the movement distance in the image becomes large and the movement amount of one frame does not fall within the prescribed width in many cases. Searching a ½-resolution image for the same prescribed width as that of the original image means significantly searching the original image for the movement amount twice the prescribed width. When the movement amount is large and matching is impossible even in the ½ image, a smaller image with a ¼ resolution or the like is used. The speed to be handled with can be calculated using the estimated speed of the target running-out moving object, the depth-wise distance to the moving object, and the processing period.

The object at a more distant position has a smaller movement amount in the image. Accordingly, judging comprehensively from lane recognition, camera attitude, and subject vehicle behavior, the motion extraction area in the original image can be narrowed to a predicted area and its vicinities in which the subject vehicle will travel, without having to perform motion extraction in the entire image. The process load may be reduced by searching for motion vectors in a smaller field of view (narrowing the search range) with increasing distance.

Next, the movement amount integration/calculation unit 440 uses the results of extraction from the pyramid images by the vertical edge search unit 430 to integrate the movement amounts with the plurality of resolutions. Then, the movement amount integration/calculation unit 440 returns the images with the plurality of resolutions to the size of the original image, and determines the integrated movement amount of the object in the original image. Accordingly, it is possible to detect motion vectors from moving objects at low to high speeds in the image.

<FIG. 7>

Figure 7:
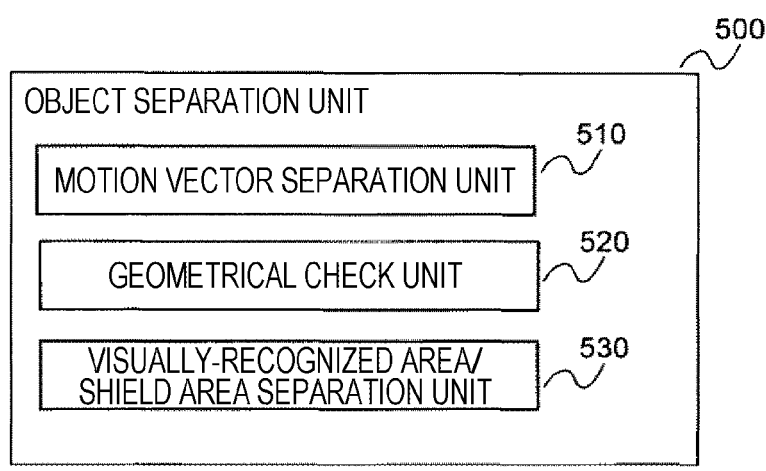
FIG. 7 is a schematic configuration diagram of an object separation unit.

Referring to FIG. 7, the object separation unit 500 includes a motion speed separation unit 510, a geometrical check unit 520, and an appearance/shield area separation unit 530. The object separation unit 500 determines whether multiple three-dimensional objects fall within the three-dimensional area 115 set by the three-dimensional object detection unit 300. When the plurality of three-dimensional objects falls within the three-dimensional area 115, the object separation unit 500 then determines whether the plurality of three-dimensional objects includes a moving three-dimensional object (approaching three-dimensional object) approaching the traveling path of the subject vehicle. These determinations are made using the results of detection by the motion vector detection unit 400 as illustrated in FIG. 12. When a moving three-dimensional object exists in the three-dimensional area 115, the object separation unit 500 defines (separates) the area of the moving three-dimensional object in the image (hereinafter, also called "separation of object"). Even though multiple three-dimensional objects exist in the three-dimensional area 115, when they are almost identical in motion in the real world (including the case where they are at a standstill), it is difficult to separate the three-dimensional objects from one another. However, when a moving three-dimensional object such as a pedestrian is running out from a blind area such as behind another three-dimensional object toward the traveling direction of the subject vehicle as illustrated in FIGS. 10 and 11, it is possible to detect early the moving three-dimensional object and prevent and avoid a collision between the subject vehicle and the moving three-dimensional object.

Figure 17:
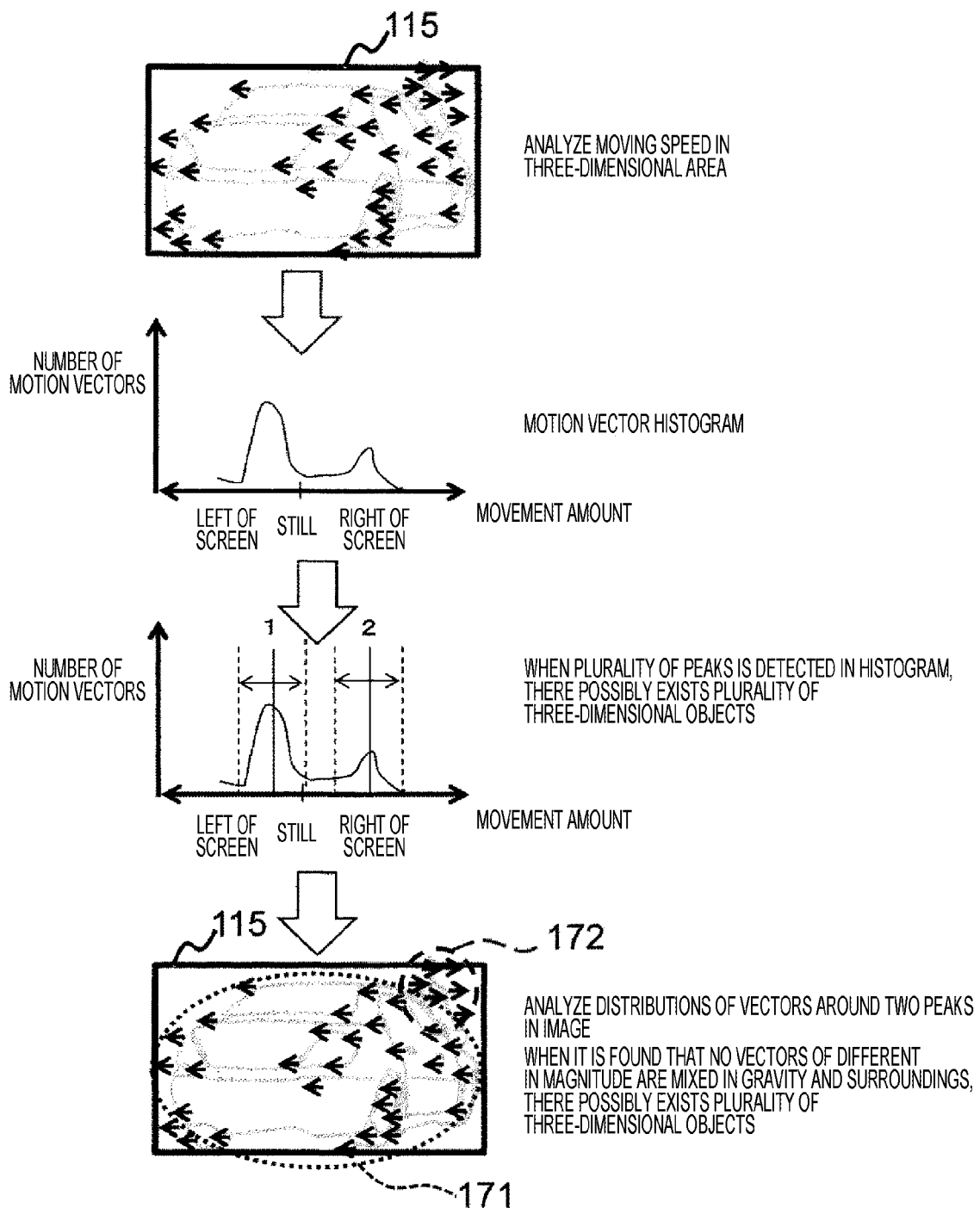
FIG. 17 is a diagram illustrating an example of process by a motion vector separation unit.

The motion speed separation unit 510 first analyzes motion vectors (motion speeds) of feature points exiting in the three-dimensional area 115 set by the three-dimensional object detection unit 300. Referring to FIG. 17, the three-dimensional object detection unit 300 detects a vehicle and a pedestrian as one three-dimensional object, and both the vehicle and the pedestrian fall within the three-dimensional area 115. To analyze the motion vectors of feature points existing in the three-dimensional area 115 of the three-dimensional object, the motion vectors detected by the motion vector detection unit 400 are represented in a histogram by movement direction and/or movement amount. The movement amount of a motion vector means the magnitude of the motion vector. Referring to the second diagram from the top of FIG. 17, the sign of the leftward motion vectors in the image is set to minus and the sign of the rightward motion vectors is set to plus, and the motion vectors are represented in a histogram by movement direction and movement amount. In the graph of the histogram, the vertical axis indicates the number of vectors, and the lateral axis indicates the movement direction and movement amount (speed) of the vectors. Graphing in this way makes it possible to clarify the distribution of speed components of the movement vectors existing in the three-dimensional area 115. Then, the generated histogram is searched for a value frequently appearing (mode value) (searching for a histogram peak). In the example of FIG. 17, the three-dimensional area 115 contains the pedestrian (running-out pedestrian) approaching the traveling path of the subject vehicle and the parked vehicle, and thus there exist total two mode values (peaks in the graph) resulting from the pedestrian and the parked vehicle. The peak on the left side in the drawing represents the motion vectors of the parked vehicle that is apparently moving leftward in the image along with the forward travel of the subject vehicle. The peak on the right side in the drawing represents the motion vectors of the pedestrian that is moving in the direction approaching the traveling path of the subject vehicle (rightward). Since the area of the pixels relating to the parked vehicle is large in the three-dimensional area, the number of the motion vectors of the parked vehicle is larger than the number of motion vectors of the pedestrian, and the left peak relating to the parked vehicle is higher than the right peak relating to the pedestrian. Only one mode value (mode) may not appear but multiple mode values may appear when multiple three-dimensional objects exist in the three-dimensional area 115 as in the example of FIG. 17.

Hereinafter, the ratio of an area of each three-dimensional object relating to the peak appearing in the entire image (hereinafter, called "appearance area") will be called "image appearance ratio", and the ratio of an area of motion vectors detected in the appearance area of each three-dimensional object relating to the peak will be called "vector appearance ratio". Whether to perform the subsequent process on the peaks appearing in the histogram is preferably decided based on a threshold R2 of the vector appearance ratio. In the example, assuming that the three-dimensional object partly appearing in the image is a pedestrian and that the ratio of appearance of the three-dimensional object in the image exceeds a predetermined threshold R1 (for example, 30%), the threshold of the vector appearance ratio of the three-dimensional object relating to each peak is decided as R2 (for example, 20%).

When the vector appearance ratio is equal to or greater than R2, the subsequent processes are performed. The type of the three-dimensional object relating to the threshold R1 may be set provisionally, and the type can be changed as appropriate to any other than pedestrian (for example, two-wheel vehicle or animal). The thresholds R1 and R2 can be changed, and R2 can be changed according to the assumed type of the three-dimensional object. The image appearance ratio (for example, what percent of the entire body of a pedestrian appears in the image) can be predicted based on the depth-wise distance of the target three-dimensional object in the image (the distance from the subject vehicle (Z distance)), the size of the target three-dimensional object in the image, and the provisional type of the target three-dimensional object. Screening by the threshold R2 makes it possible to remove noise, thereby to reduce the process load of the computer 3 and improve the accuracy of the subsequent processes.

When the vector appearance ratio is equal to or more than the threshold R2, it is determined whether the distributions of vectors exist as one mass in the image. As described above, in the example, the two peaks exist in the moving speeds of the parked vehicle and the running-out pedestrian as illustrated in the third diagram from the top of FIG. 17. The areas with vector distributions in the peripheries of the peaks are set as error areas. It is analyzed how the motion vectors existing in the ranges of two arrows illustrated in the third diagram from the top of FIG. 17 (motion vectors constituting the peaks) are distributed in the image. The gravity and vertical distribution range of the motion vectors are represented in an oval form such that 80% or more of the vectors constituting each peak fall within the range and the oval is set in the image. As a result, in the example, the parked vehicle is detected as a horizontally long oval 171 and the upper body of the running-out pedestrian is detected as a small oval 172 above the long oval 171 as illustrated in the fourth diagram from the top of FIG. 17. However, when more than 30% of vectors outside the range of the peak (vectors outside the arrow range illustrated in FIG. 17) exist in the oval 171 or 172, it is regarded that the vectors are irregular variations in the histogram caused by noise and there exists no object having vectors centered on the peak.

In the example, the oval 171 indicating the speed distribution of the subject vehicle is similar in size to the three-dimensional area 115 (three-dimensional object candidate). The oval 171 includes 80% of the motion vectors constituting the peak representing the vehicle and 30% or less of the vectors falling outside the range. Accordingly, it is first determined in the histogram analysis that the highest peak (the peak 1 illustrated in FIG. 17) represents the presence of a three-dimensional object. Then, it is determined whether the three-dimensional object is a moving object (moving three-dimensional object) or a still object (still three-dimensional object) from the direction and/or moving speed (movement amount) of the motion vectors in the oval. In the example, it is determined that the three-dimensional object is a still three-dimensional object based on the facts that the direction of the motion vectors of the three-dimensional object is the direction toward the left of the screen (the direction toward the outside of the screen) and the moving speed is closer to the speed of the subject vehicle.

The motion vectors constituting the second highest peak (the peak 2 illustrated in FIG. 17) are distributed in a cluster at the upper right of the three-dimensional area. The oval 172 defined based on that distribution includes 80% of the motion vectors constituting the second highest peak and 30% or less of the vectors falling outside the range. Accordingly, it is determined that the second highest peak also represents the presence of a three-dimensional object. Then, it is determined that the three-dimensional object is a moving three-dimensional object approaching the traveling path of the subject vehicle (approaching three-dimensional object) based on the fact that the direction of the motion vectors of the three-dimensional object is the direction toward the right of the screen (the direction toward the traveling path of the subject vehicle). The type of the three-dimensional object can be assumed from the moving speed and size (dimensions) of the three-dimensional object. When it is determined that the object in the three-dimensional area 115 is a moving three-dimensional object, the object separation unit 500 defines (separate) the area of the moving three-dimensional object (the pedestrian as an approaching three-dimensional object) in the image.

Next, the geometrical check unit 520 performs geometrical check on the approaching three-dimensional object (also called "running-out three-dimensional object candidate") extracted by the motion speed separation unit 510. First, the geometrical check unit 520 extracts the running-out three-dimensional object candidate on the minimum condition that 30% or more of the entire body of a pedestrian as the smallest three-dimensional object assumed in the example appears in the image. The motion speed separation unit 510 determines whether the number of vectors exceeds the assumed threshold (20%) for a pedestrian. In this process, however, the geometrical check unit 520 checks whether the distribution of the motion vectors in the image corresponds to 30% or more of the entire body of the pedestrian. In the example, as illustrated in FIG. 18, the oval (approaching three-dimensional object) accounts for 30% or more of the entire body of the pedestrian standing on the road surface at the same depth-wise distance as that from the detected three-dimensional object. In the case of the pedestrian, an image appearance ratio of 30% or more can be observed. Accordingly, the geometrical check unit 520 determines from geometrical analysis that an object with the size of a pedestrian is moving in the image and the object is more likely to be a running-out pedestrian. Further, assuming that the object is a running-out object candidate other than a running-out pedestrian (for example, two-wheel vehicle, animal, or vehicle), the geometrical check unit 520 can check whether 30% or more of the running-out object candidate appears in the image as in the case where the object is assumed as a pedestrian. The geometrical check unit 520 preserves a candidate with an image appearance ratio of 30% or more as a running-out candidate, and excludes a candidate with an image appearance ratio of less than 30% from the running-out candidate because the candidate is highly unlikely to be the object or it is not possible to determine by pattern matching that the candidate is the object even though the candidate is actually the object. This makes it possible to avoid unnecessary pattern matching, improve the detection accuracy of a moving three-dimensional object, and reduce the load of the computer 3.

Next, the appearance/shield area separation unit 530 divides a presumed pedestrian frame 180 generated using camera geometry into an appearance area 191 and a shield area (non-appearance area) 192 as illustrated in FIG. 19. In the example, the peak of the motion vectors of the running-out pedestrian is the second peak. Accordingly, the appearance/shield area separation unit 530 divides the presumed pedestrian frame 180 into the area with the motion vectors around the second peak and the other area, and sets the former area as the appearance area 191 and the latter area as the shield area 192. In geometrical check, the size of the entire image of the candidate object (in FIG. 18, the dotted-line frame 180 (presumed pedestrian frame) indicating the size of the pedestrian candidate in the image) can be grasped.

In the example, as illustrated in FIG. 19, the appearance/shield area separation unit 530 separates the running-out pedestrian candidate into the appearance area and the shield area by a labeling method to expand the areas in XY direction according to the distribution of the motion vectors. Alternatively, a simple method may be used to divide the pedestrian candidate only in the vertical or lateral direction. In this case, only the speed vectors in the rightward direction (the direction toward the traveling path of the subject vehicle) are vertically and laterally projected. This makes it possible to determine where to perform area division to obtain a visible area (appearance area).

In addition, the accuracy of pattern matching in the subsequent process may be improved by setting not only the condition that the ratio of the appearance area in the entire image (image appearance ratio) exceeds the threshold (30% in the foregoing example) but also an additional condition that the appearance area includes a portion likely to be a feature in the pattern matching (in the case of a pedestrian, a head area or a leg area). For example, as illustrated in the lower part of FIG. 18, pattern matching can be performed based on the additional condition that the pedestrian candidate frame is divided into a head portion, a trunk portion, and a leg portion, and 50% or more of the portion estimated as the head or the legs is visible in the appearance area. This is because, as a nature of pattern matching, even if the image appearance ratio of an approaching three-dimensional object exceeds the threshold (30%), when the image does not include the portions representing the features of the object (the legs and head in the case of a pedestrian), it may not be possible to determine the type of the approaching three-dimensional object by pattern matching, which leads to reduction in the accuracy of pattern matching.

Accordingly, setting such an additional condition as described above makes it possible to improve the accuracy of determining the type of an approaching three-dimensional object by subsequent pattern matching.

<FIG. 8>

Figure 8:
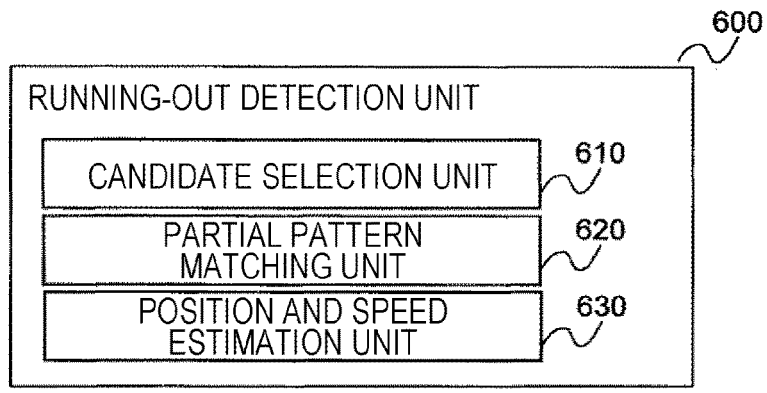
FIG. 8 is a schematic configuration diagram of a running-out detection unit.

Next, the running-out detection unit 600 performs pattern matching of the running-out three-dimensional candidate. Referring to FIG. 8, the running-out detection unit 600 includes a candidate selection unit 610, a partial pattern matching unit 620, and a position and speed estimation unit 630. The description of the example is mainly focused on the detection of a running-out pedestrian. In actuality, the running-out detection unit 600 performs pattern matching of an approaching three-dimensional object with patterns of two-wheel vehicle, animal, and vehicle to determine the type of the approaching three-dimensional object.

The candidate selection unit 610 selects the candidate to be subjected to pattern matching from one or more approaching three-dimensional objects extracted by the object separation unit 500, and selects patterns of pedestrian, two-wheel vehicle, and vehicle to be subjected to pattern matching with the candidate. The geometrical check unit 520 has already checked the visible sizes in the image. The candidate selection unit 610 additionally checks the moving speed of the approaching three-dimensional object (for example, whether the moving speed is too fast for a pedestrian) and the mode of time-series shape change (for example, the time-series shape change is reasonable for a pedestrian), and also determines whether the candidate is possibly an artificial object, a human, or an animal to select the pattern for pattern matching.

In this case, pattern matching is performed only on the three-dimensional object likely to collide with the subject vehicle using the speed and depth-wise position of the approaching three-dimensional object. To calculate the accurate speed of a candidate object (approaching three-dimensional object or moving three-dimensional object), the position and speed estimation unit 630 uses only the parallax image in the appearance area acquired by the appearance/ shield area separation unit 530 to recalculate the depth-wise position (position) of the candidate object in a situation without mixture of multiple objects. Further, the position and speed estimation unit 630 redetermines the speed distribution of the motion vectors included in the appearance area and calculates the average speed after removal of extreme outliers, thereby recalculating the accurate lateral movement speed (speed) of the approaching three-dimensional object. This makes it possible to improve the accuracy of position and speed of the candidate object and also improve the accuracy of the subsequent processes using the position and the speed. For example, when an object at a very high moving speed is a two-wheel vehicle candidate, the position and speed estimation unit 630 determines the possibility of a collision from the depth and moving speed of the two-wheel vehicle and the predicted behavior of the subject vehicle on the assumption that a standard two-wheel vehicle will appear. When it is clear that the two-wheel vehicle will pass through in front of the subject vehicle before the subject vehicle reaches the depth-wise position of the two-wheel vehicle, no pattern matching is performed. This is because the subject vehicle does not have to apply brakes with the approach of a three-dimensional object not likely to collide, and whether the approaching three-dimensional object is a two-wheel vehicle or a pedestrian is unrelated to preventive safety. In addition, when the approaching three-dimensional object is moving at too a slow speed and there is a high possibility that the subject vehicle will pass through before the approaching three-dimensional object crosses over the traveling path of the subject vehicle, no pattern matching of the approaching three-dimensional object may be performed.

One candidate may be matched with multiple patterns (for example, pedestrian and two-wheel vehicle).

Figure 20:
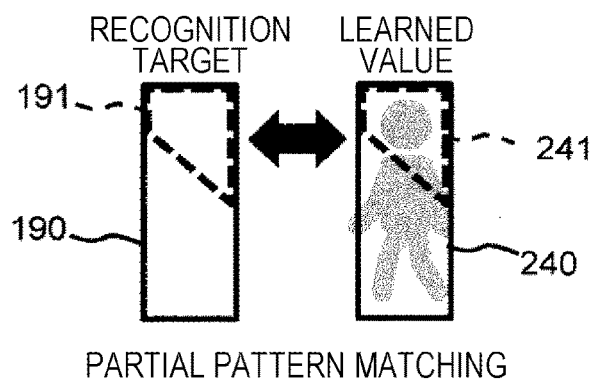
FIG. 20 is an illustrative diagram of partial pattern matching.

The partial pattern matching unit 620 performs pattern matching using only the appearance area 191 of the recognition target (presumed pedestrian frame) 180 as illustrated in FIG. 20. In the example, for the sake of specific description, it is assumed that the candidate selection unit 610 selects the running-out candidate as a pedestrian candidate. In this case, the partial pattern matching unit 620 performs pattern matching of a learned pedestrian pattern 240 and the appearance areas 241 and 191 of the recognition target 180. The partial pattern matching unit 620 scores the result of the pattern matching taking the appearance area 191 into account. When the approaching three-dimensional object is likely to be a pedestrian, the partial pattern matching unit 620 gives a higher score of 1 to 10 taking the appearance area into account. Then, when the approaching three-dimensional object is unlikely to be a pedestrian, the partial pattern matching unit 620 gives a score of 0 to −10. However, the definite recognition may be difficult by a single frame with the insufficient appearance area. In addition, the recognition is also susceptible to the shape of the background. Accordingly, the partial pattern matching unit 620 decides the pattern of the approaching three-dimensional object (running-out pedestrian in the example) after high scores were continuously given in pattern matching even with changes in the background. For example, the partial pattern matching unit 620 determines that the approaching three-dimensional object is a pedestrian on the two conditions that matching scores are 4 or more points in three consecutive frames before the determination and that the accumulated matching scores are total 25 points or more. This makes it possible to determine that the approaching three-dimensional object is a running-out pedestrian in the least three frames.

<FIG. 9>

Figure 9:
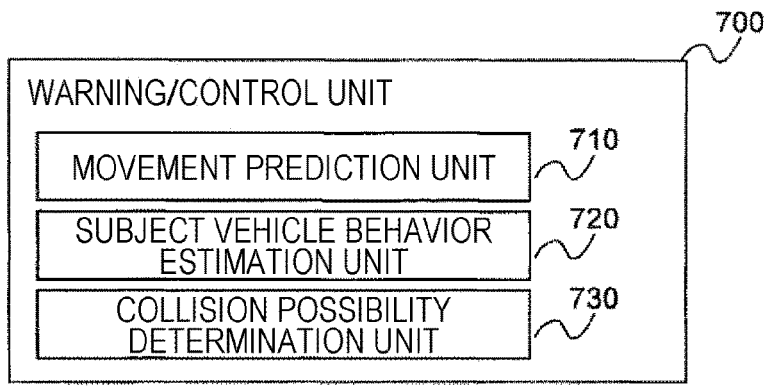
FIG. 9 is a schematic configuration diagram of a warning/control unit.

The warning/control unit 700 performs warning and control of the subject vehicle using the information on the detection of the approaching three-dimensional object and the information on the behavior of the subject vehicle. Referring to FIG. 9, the warning/control unit 700 includes a movement prediction unit 710, a subject vehicle behavior estimation unit 720, a collision possibility determination unit 730, a warning unit 740, a control unit 750, and a display unit 760.

Figure 21:
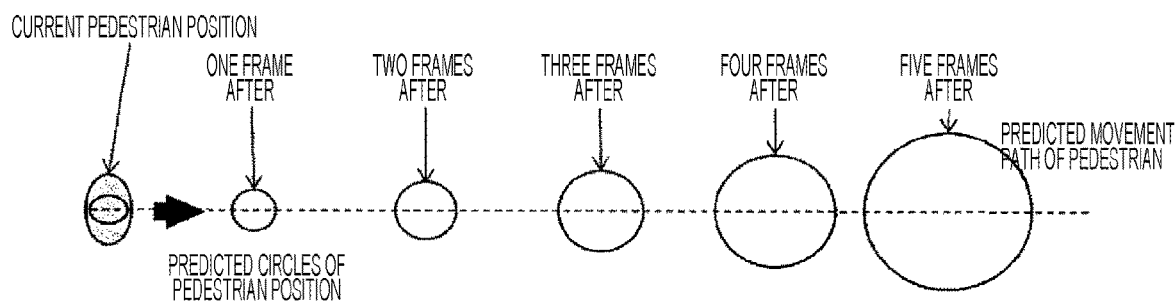
FIG. 21 is a diagram illustrating an example of predicted positions of a running-out pedestrian.

The movement prediction unit 710 estimates the predicted movement path of the recognized approaching three-dimensional object (running-out object) from its movement speed in the depth direction and lateral movement speed. With the lapse of a longer time from the current frame, the predicted position of the approaching three-dimensional object is possibly more displaced. Accordingly, to determine the possibility of a collision with the approaching three-dimensional object, the movement prediction unit 710 predicts the movement of the approaching three-dimensional object. Hereinafter, the case where the approaching three-dimensional object is a pedestrian will be described as an example. Referring to FIG. 21, the movement prediction unit 710 estimates the predicted positions in accordance with the current movement speed of the pedestrian from the current position of the pedestrian. The use of a high-frame camera capable of capturing accurately motion vectors allows the utilization of acceleration, thereby making it easy to react to abrupt running out. In this case, however, long-term acceleration is hard to predict, and thus the prediction after the lapse of a long time is difficult. The movement prediction unit 710 then estimates an error in the movement position of the pedestrian. The error in the position of the pedestrian is accumulated in accordance with the lapse of time from the current time. Accordingly, at a later prediction time, the predicted position is more likely to be erroneous. FIG. 21 illustrates prediction circles that express the magnitude of displacement of the predicted pedestrian position taking into account the dispersion in the movement speed of the pedestrian up to this point and the variations in the motion vectors in the appearance area 191. Each of the prediction circles is defined on the assumption that the possibility of the pedestrian entering the circle one frame after is 70%.

The subject vehicle behavior estimation unit 720 calculates the predicted running path of the subject vehicle using the speed and yaw rate of the subject vehicle.

From the information on the predicted movement path of the pedestrian estimated by the movement prediction unit 710 and the information on the predicted running path of the subject vehicle estimated by the subject vehicle behavior estimation unit 720, the collision possibility determination unit 730 extracts a point of intersection between the two predicted paths, and calculates a time TTC that will be taken by the subject vehicle to reach the point (time-to-collision). In this case, the movement prediction unit 710 calculates the TTC regardless of whether there will occur a collision with the pedestrian. The position of a still pedestrian is regarded as a point. The movement prediction unit 710 calculates the time-to-collision (TTC) only when the distance between the line of the traveling path of subject vehicle and the position of the still pedestrian (offset width a) falls within a predetermined range. In this way, the collision possibility determination unit 730 calculates the TTC on the assumption that there will occur a collision with the detected pedestrian. The objects outside the target of warning and control are excluded from the detection target without execution of pattern matching. However, when it has been discovered from the calculation result of the TTC that any three-dimensional object outside the target of control and warning is clearly mixed, the subsequent detailed processes may be omitted at the time of the discovery.

Figure 22:
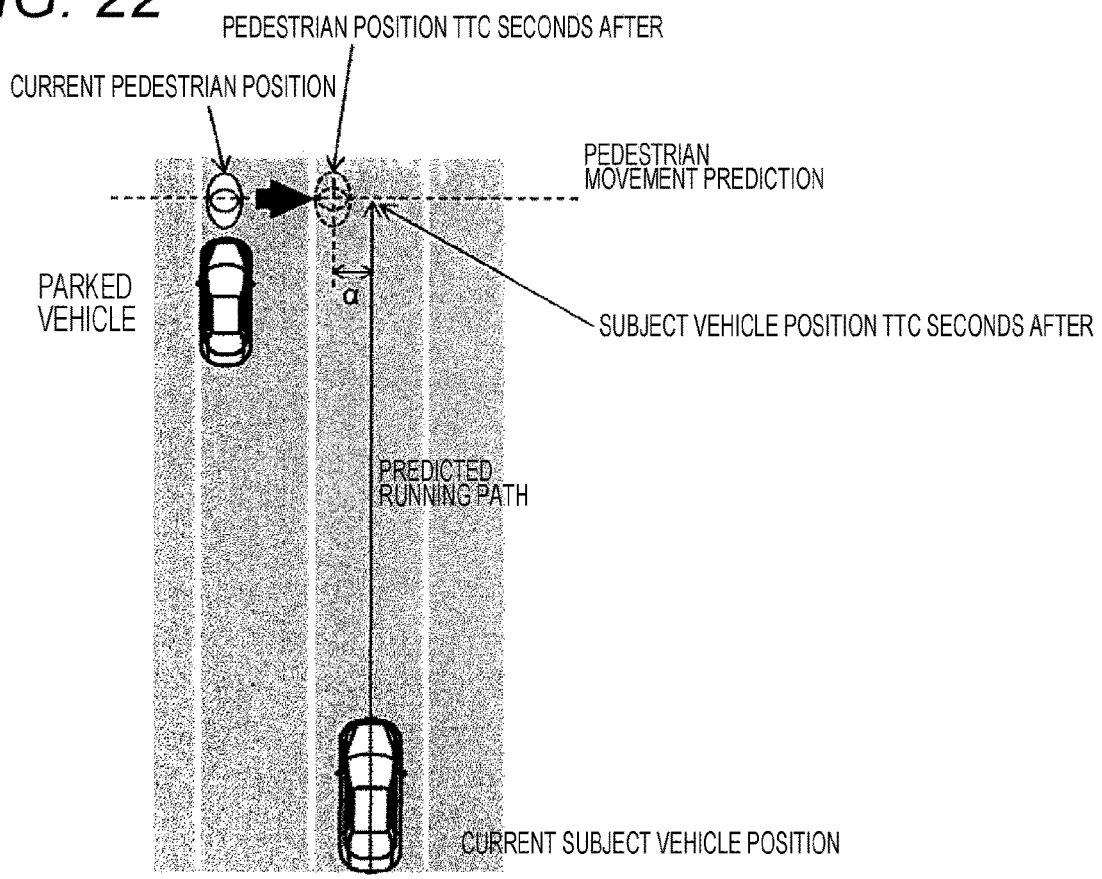
FIG. 22 is an illustrative diagram of determination on the possibility of a collision with a pedestrian.

<FIGS. 21 and 22>

Next, the collision possibility determination unit 730 calculates the predicted place where the pedestrian will be after the lapse of the calculated TTC seconds, and determines the possibility of a collision. FIG. 22 illustrates an example of the calculation. In this case, the pedestrian is crossing over the traveling path of the subject vehicle and both the pedestrian and the subject vehicle are traveling in a straight line. The TTC before the subject vehicle reaches the depth-wise position of the pedestrian has already been determined. Accordingly, the collision possibility determination unit 730 estimates the predicted position where the pedestrian is likely to exist after the lapse of the TTC. The position of the pedestrian is predicted in prediction circles as illustrated in FIG. 21. Accordingly, the collision possibility determination unit 730 determines the possibility of a collision from the position of the pedestrian taking into account the central position of the subject vehicle after the lapse of the TTC seconds and the offset width a of the pedestrian. The pedestrian may have already crossed over the lane of the subject vehicle or the movement of the pedestrian is slow and the vehicle may pass through first. Thus, the position of the pedestrian and the speed information are important in determination on the possibility of a collision. In the case where part of the prediction circle exists at a position of a collision with the vehicle, the control of the subject vehicle is altered based on whether the center of the collision circle exists at a position with a possibility of a collision or what percent of the collision circle is occupied by the area with a possibility of a collision.

When determining that there is a possibility of a collision based on the predicted position of the pedestrian after the lapse of the TTC seconds, the collision possibility determination unit 730 calculates the possibility of a collision with the pedestrian after the lapse of the TTC seconds, and outputs instructions to the display device 5, the warning device 6, the throttle valve/injector 7, or the brake 8 in accordance with the possibility. When there is a high possibility, it is desired to perform a vehicle control for avoiding a collision by executing a collision avoidance action through the brake 8, for example (strong vehicle control). In contrast, when there is a low possibility, it is desired to perform a vehicle control for suppressing acceleration under control of the throttle valve/injector 7 (weak vehicle control) or to perform no vehicle control but output only a warning from the warning device 6 or the display device 5 because performing an unreasonable vehicle control (for example, applying sudden brakes to make an abrupt slowdown even when there is no risk of collision) would increase the possibility of a rear-end collision with the following vehicle. In the example, as illustrated in FIG. 24 described later, the collision possibility determination unit 730 calculates the possibility of a collision based on the accuracy of position of the pedestrian and the offset width a at the predicted collision time.

<FIGS. 23 and 24>

The levels and contents of vehicle control in the presence of an approaching pedestrian (approaching three-dimensional object) will be described with reference to FIG. 23. In the example, the control level is raised to perform a stronger control with increase in the possibility of a collision. In the example, the control level is decided based on the accuracy of position of the pedestrian and the offset width a at the predicted collision time in accordance with the table shown in FIG. 24. The control level is raised based on the concept that the possibility of a collision becomes higher as the position accuracy is higher and the offset width a is smaller.

As illustrated in FIG. 23, at control level 1, no vehicle control is performed but the display device 5 (display) indicates soundlessly the presence of a pedestrian near the vehicle. If there is an error in the detected position or predicted position of the pedestrian, only a visual display is provided to avoid interference with the user's driving.

At control level 2, there is a possibility of a collision and thus the acceleration of the vehicle is suppressed and the emergency brake is prepared but no control of interfering with the driver's driving is performed because the predicted position of the pedestrian may be displaced or the vehicle may pass through a place at a short distance from the pedestrian.

At control level 3, the emergency brake is not applied but it is determined that there is a very high possibility of a collision. Accordingly, the warning device 6 issues a warning to notify the user of the presence of the pedestrian and preliminary preparations for collision avoidance are made. The brake hydraulic pressure is raised to increase the speed of response to the user operating the brake 8, the hydraulic pressure is raised to allow the emergency brake to activate earlier when the accuracy of position of the pedestrian becomes higher, and the throttle valve/injector 7 is controlled to suppress acceleration.

Under control level 4, it is considered certain that the subject vehicle will collide with the pedestrian, the brake 8 is activated to bring the subject vehicle to an emergency stop and the warning device 6 notifies by voice the driver of the presence of the pedestrian.

The control level is determined based on the accuracy of predicted position of the pedestrian and the offset width a illustrated in FIG. 23. As the offset width a becomes longer, the possibility of a collision between the pedestrian and the subject vehicle is lower and thus the control level is decreased. The same thing applies to the accuracy of predicted position of the pedestrian. When the predicted position of the pedestrian is likely to have error, a lower control level is determined.

The collision possibility determination unit 730 outputs control signals to the display device 5, the warning device 6, the throttle valve/injector 7, or the brake 8 in accordance with the contents of the control at the individual control levels. For example, the display device 5 includes an in-vehicle display and a meter panel. These components indicate the presence of the pedestrian. The display device 5 may show simply the positional relationship between the pedestrian and the vehicle. The warning device 6 issues a sound indicating a high possibility of a collision with the pedestrian in accordance with the control signal.

<FIG. 25>

Figure 25:
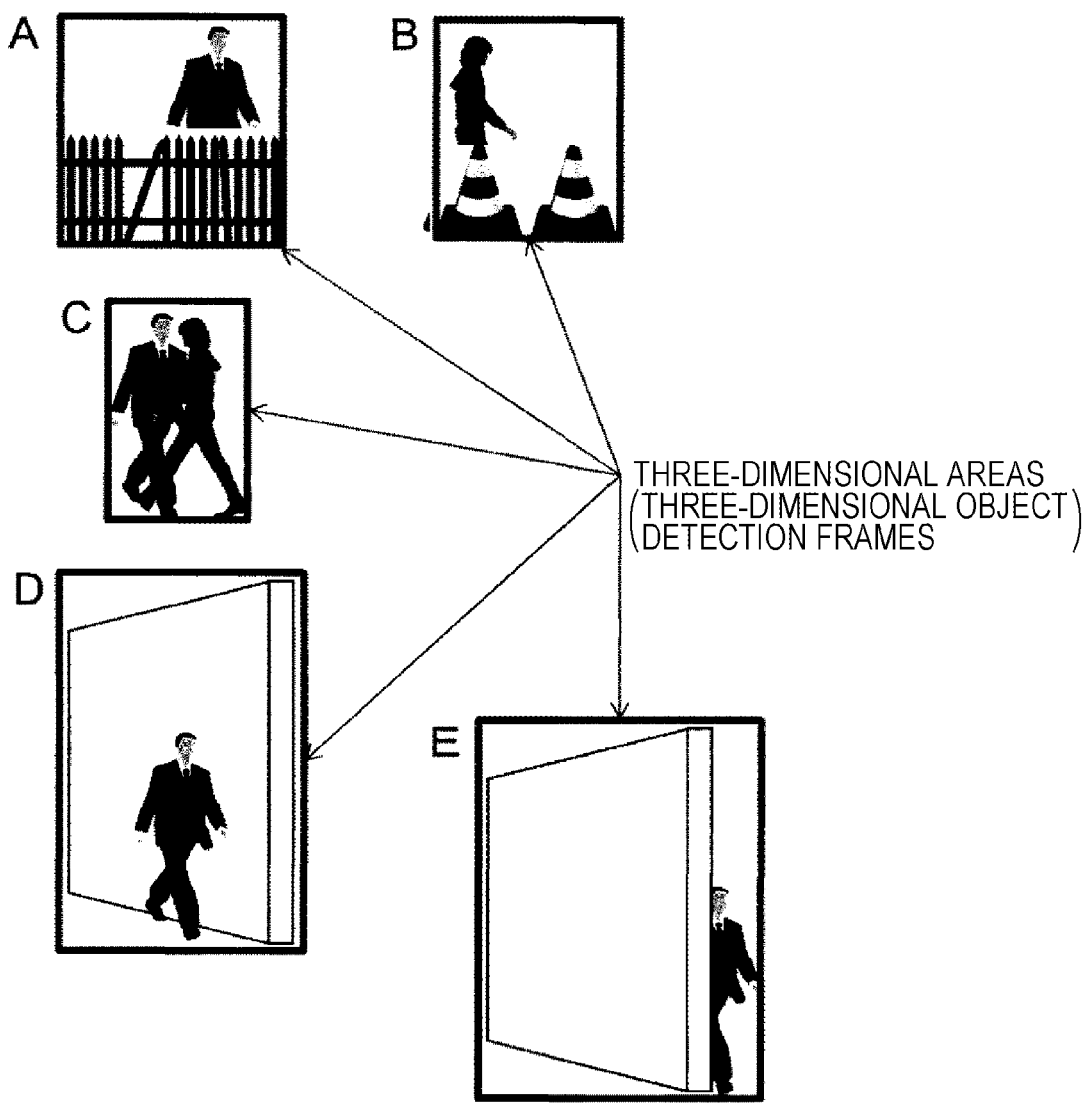
FIG. 25 is an illustrative diagram of patterns of pedestrian running-out scenes.

FIG. 25 illustrates examples of scenes in which a three-dimensional object shields part of a moving three-dimensional object (pedestrian) with a difference in speed between the two objects, and the advantageous effect of the example can be expected in these scenes. In this case, the running-out pedestrian is taken as an example. However, another running-out object such as a two-wheel vehicle or an animal may be possible. The shielding objects are not limited to the ones illustrated in the drawings but may be any object other than the ones illustrated in the drawing.

In the foregoing description, a pedestrian running out from behind a parked vehicle is used as an example. Hereinafter, another example will be described. First, it is assumed that there is a pedestrian behind a road structure such as a guard rail or a fence as illustrated in A of FIG. 25. At the distance-based three-dimensional object detection, it is predicted that, when the distance between the guard rail or the fence and the pedestrian is short, the pedestrian and the guard rail will not be separated from each other but they will be detected one mass (three-dimensional object). The same thing applies to the case where there is a pedestrian behind traffic cones as illustrated in B of FIG. 25. At the distance-based three-dimensional object detection, the road structure such as a guard rail and the pedestrian can be individually detected only after a period of time since the pedestrian has left behind the road structure. It is thus difficult to detect a pedestrian running out of a road structure until the pedestrian moves away about 1 m or more from a neighboring three-dimensional object even though the upper body of the pedestrian has appeared in the image. In particular, not only in the case where the entire body of a pedestrian is hidden from view behind another three-dimensional object but also in the case where only the lower body of the pedestrian is hidden from view, conventional detection systems would unfavorably output a detection result different from human sense (that is, the pedestrian is not detectable). In the example, it is possible to separate and detect the running-out pedestrian alone, three frames after the pedestrian and the road structure have been detected as one three-dimensional object. Although it is conventionally difficult to detect the pedestrian until the pedestrian moves away about 1 m from the surrounding object such as a guard rail or a fence, the example allows the detection of the pedestrian even in a situation where the lower body of the pedestrian is hidden from view. Accordingly, it is possible to detect a pedestrian who is likely to run out from a clearance in the guard rail, between the fences, or the end of the guard rail even before actual running out, which is effective in preventing an accident to the running-out pedestrian. A and B of FIG. 25 illustrate the cases where the road structure is positioned closer to the side of the subject vehicle than the pedestrian. The detection of the pedestrian is also possible when the positional relationship between the pedestrian and the road structure is reversed, that is, when the road structure is positioned closer to the side of the subject vehicle. As illustrated in E of FIG. 25, the road structure may be larger than the pedestrian.

Besides, the pedestrian can be separated by detecting a difference in motion vector. Accordingly, even when multiple pedestrians are walking in clusters (for example, in a shopping area), the vehicle control can be performed using the predicted movements of the pedestrians. Conventionally, when multiple pedestrians overlap at short depth-wise distances in the line of sight from the subject vehicle as illustrated in C of FIG. 25, these pedestrians are collectively detected as one large three-dimensional object in many cases. According to the example, however, multiple three-dimensional objects can be separated by analyzing the direction distribution and/or movement amount distribution (speed distribution) of the motion vectors in the three-dimensional area of the three-dimensional object. In particular, the use of motion vector detection based on high frame-rate images captured by high-speed cameras as illustrated in FIG. 14 makes it possible to separate stably multiple overlapping persons at high density and accuracy of the motion vectors. It is also possible to improve the accuracy in identifying the type of the approaching three-dimensional object by estimating the appearance area and shield area of the approaching three-dimensional object from the analysis results of the motion vectors and performing partial pattern matching of the appearance area (matching only the appearance area to identify the type of the three-dimensional object). In addition, based on the motion vectors appearing in the appearance area, the movement direction and speed of the partially shielded pedestrian are properly estimated and the possibility of a collision between the subject vehicle and the pedestrian is determined. In accordance with the possibility of a collision, the display device 5 and the warning device 6 make a notice of the approaching pedestrian and the brake 8 and others perform vehicle control.

In the case described above, another three-dimensional object exists closer to the subject vehicle than the moving three-dimensional object (the pedestrian in the example of FIG. 25) and part of the moving three-dimensional object is hidden from view behind the other three-dimensional object, that is, the three-dimensional area of the detected three-dimensional object is formed from the moving three-dimensional object and the other three-dimensional object (however, the fore-and-aft positional relationship between the moving three-dimensional object and the other three-dimensional object does not matter). However, the example of the present invention is applicable to not only the foregoing case but also the case where another three-dimensional object larger in size than the moving three-dimensional object exists behind the moving three-dimensional object as seen from the subject vehicle and the entire moving three-dimensional object falls within the three-dimensional area of the other three-dimensional object, that is, the three-dimensional area of the detected three-dimensional object is formed only from the other three-dimensional object (however, the moving three-dimensional object is positioned closer to the subject vehicle than the other three-dimensional object). In the example illustrated in D of FIG. 25, there is a pedestrian right in front of a structure larger in size than a human (for example, wall, building, massive tree, or the like). Also in this case, it is possible to detect the motion vectors of the pedestrian and separate the pedestrian based on the motion vectors. Accordingly, the pedestrian can be detected before running out from behind the structure.

When a door of a stopped vehicle is suddenly opened to block the area in front of the subject vehicle and a person (passenger) gets on or off the stopped vehicle, the passenger is hidden from view behind part of the stopped vehicle (usually, the opened door) but the passenger can be detected as in the cases of passengers illustrated in A and B of FIG. 25. In addition, the door of the stopped vehicle is detected as a stopped three-dimensional object after completion of opening and closing, which is identical to the result of the distance-based detection (conventional detection result). In the example, however, the door can be detected as an approaching three-dimensional object (moving three-dimensional object) during opening and closing. That is, according to the example, the door can be detected as an approaching three-dimensional object before completion of opening and closing.

<FIG. 26>

Figure 26:
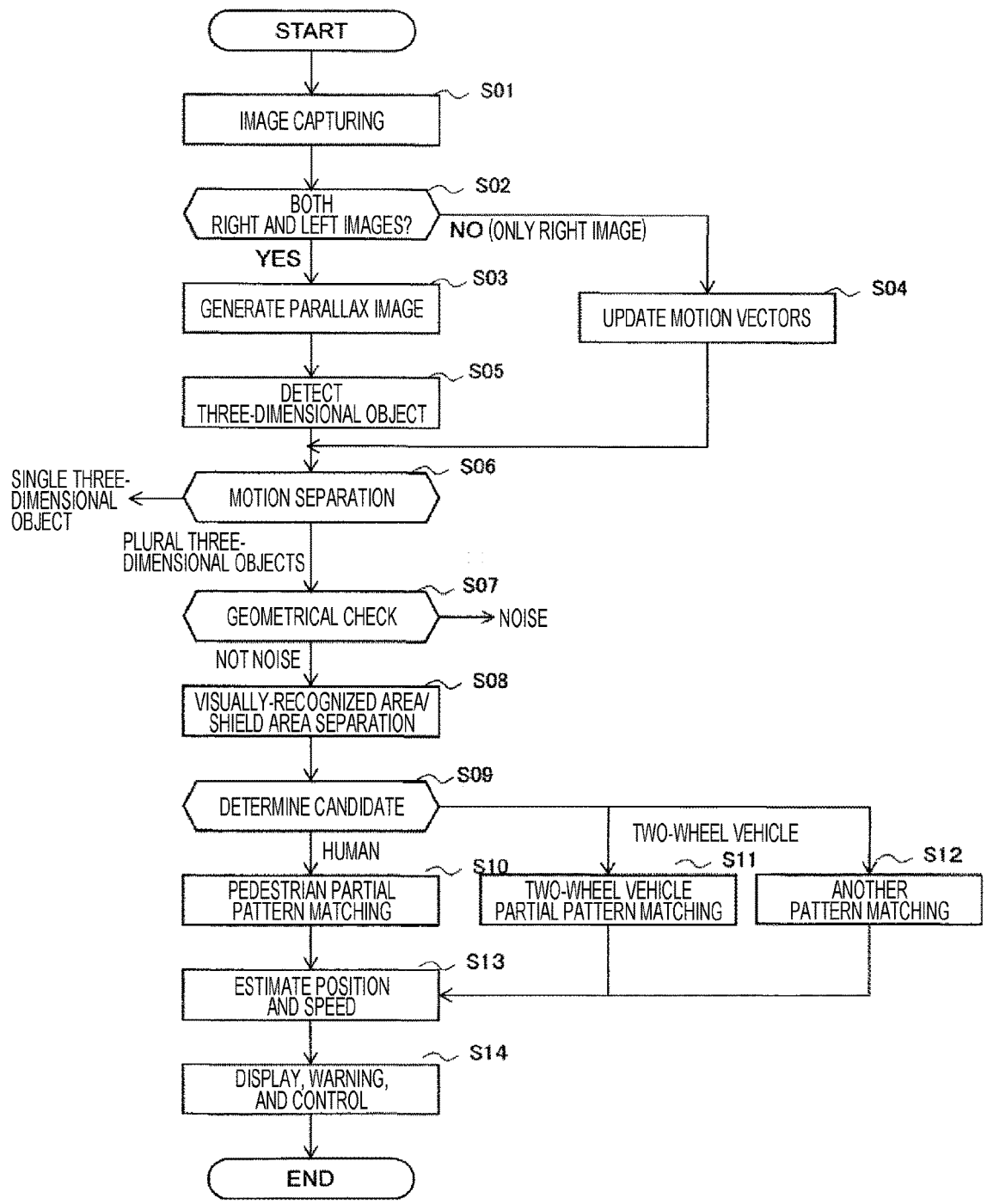
FIG. 26 is a diagram illustrating an example of a process flow of running-out detection.

Next, an outline of the example will be described with reference to the process flow of FIG. 26.

In S01, the imaging units 100 and 110 of the left and right cameras capture images.

In S02, it is predetermined whether this process timing is the imaging timing for both the right and left images or the imaging timing for only the right image, as illustrated in FIG. 14. When it is determined in S02 that the right and left images have been captured in the current frame, the process moves to S03. When it is determined in S02 that only the right image has been captured, the process moves to S04. At the start of the process for the first frame, the right and left images are captured and thus the process moves to S03.

In S03, the parallax image generation unit 200 generates a parallax image using the right and left images and the process moves to S05.

In S05, three-dimensional object detection unit 300 performs three-dimensional object detection using the parallax image generated in S03. A three-dimensional object candidate is extracted from the image and tracked. When the candidate can be tracked as a three-dimensional object for two frames, the candidate is detected as a three-dimensional object.

In S04, the motion vector detection unit 400 uses the past right images and the original right image to update the motion vectors to determine the movement direction and speed of the three-dimensional object detected in S05. It is possible to calculate the movement direction and speed without error at a high density even by a simpler tracking method through searching a limited search range of motion vectors using high frame rates and pyramid images.

In S06, using both the three-dimensional object detected in S05 by the three-dimensional object detection unit 300 and the motion vectors detected in S04 by the motion vector detection unit 400, it is determined whether the three-dimensional object is not consisted of multiple objects different in motion. The directions and speeds (movement amounts) of the motion vectors existing in the three-dimensional area of the three-dimensional object (the position of the three-dimensional object candidate) in the image are represented in a histogram to analyze the distributions of speed directions and speeds and determine whether there exist multiple three-dimensional objects in the three-dimensional area. When there exist multiple distributions of speed directions or when there exist multiple distributions of speeds in the same speed direction, it is determined that there exist multiple objects and at least one of them is a moving three-dimensional object, and the portion of the moving three-dimensional object is specified (separated) in the image, and then the process moves to S07. In this case, when the high-frame rates or the pyramid images or both are used, the motion vectors can be calculated at high density and high accuracy to improve significantly the accuracy of separation of the moving three-dimensional object.

In contrast, when a single distribution of speed directions and a single distribution of speed distributions are observed, it is determined that there exists a single object or multiple objects moving at an equal speed and in almost the same direction, and the detected three-dimensional object is handled as a single three-dimensional object, and then the process for the detected three-dimensional object is terminated. Even though multiple objects moving at almost equal speeds and in almost the same direction are detected but are handled as a single three-dimensional object in S05, there occurs no major problem in the subsequent warning and control processes of the subject vehicle. When there is a wide clearance between the plurality of objects, these objects can be easily detected as separate objects without problem. When the clearance between the objects is very narrow, these objects may be detected as a single three-dimensional object. In such a case, however, the clearance is too narrow for the subject vehicle to pass through and thus there occurs no problem in this case as well.

In S07, it is determined whether multiple motion vectors existing in the portion of the moving three-dimensional object in the image form a motion vector group or are dispersed like noise. Further, assuming that the pedestrian can be visually recognized by 30% or more using camera geometry, and it is determined whether motion vectors equal to or more than the threshold can be found in the area of the moving three-dimensional object. When the result of the former determination is "dispersed" and the result of the latter determination is "not found", it is determined that the moving three-dimensional object separated in S06 is noise and the process is terminated. Meanwhile, when the result of the former determination is "forming a group" and the result of the latter determination is "found", the process moves to S08.

In S08, based on the presence portion of the moving three-dimensional object specified in S06, the depth-wise position of the moving three-dimensional object, and the assumed size of the moving three-dimensional object (for example, 170 cm in the case of a pedestrian), the appearance area and the shield area of the moving three-dimensional object are specified in the image. In this case, the percentage of the assumed moving three-dimensional object represented by the appearance area is also calculated. Assuming that the moving three-dimensional object is a pedestrian, when the appearance area exceeds 30%, there remains a possibility that the moving three-dimensional object is a two-wheel vehicle or any other moving three-dimensional object (for example, an animal).

In S09, it is determined which of the moving object candidates such as pedestrian, two-wheel vehicle, and animal to be used for pattern matching with the appearance area specified in S08. When the appearance area is large, pattern matching may be performed with each of pedestrian and two-wheel vehicle.

In S10, S11, and S12, partial pattern matching is performed by comparing the portion specified as the appearance area in the image in S08 to the appearance area of the pattern (the pattern may be acquired by learning) decided in S09 to determine whether the two are high in matching degree. Pattern matching is influenced by the background and the deformation of a pedestrian or the like. Accordingly, the final conclusion is made using the determination results in multiple frames. S10 is pattern matching of pedestrian, S11 is pattern matching of two-wheel vehicle, and S12 is pattern matching of another candidate (animal or the like). When the type of the moving three-dimensional object is determined, the process moves to S13.

In S13, without reference to the shield area, only the parallax and motion vectors obtained from the appearance area are used to estimate the more accurate position and speed of the moving three-dimensional object.

In S14, the control level (see FIG. 24) is decided in accordance with the position and speed estimated in S13, and then indication, warning, and control are provided in accordance with the decided control level.

As described above, in the example, pedestrians and two-wheel vehicles hidden from view behind three-dimensional objects can be detected before they run out. In addition, indication, warning, and control are allowed in accordance with the possibility of contact with the subject vehicle estimated from the position and speed of the detected moving three-dimensional object.

The foregoing sequence of the processes is a mere example and may be changed as appropriate as far as the same results can be achieved.

<Additional Remarks>

Figure 27:
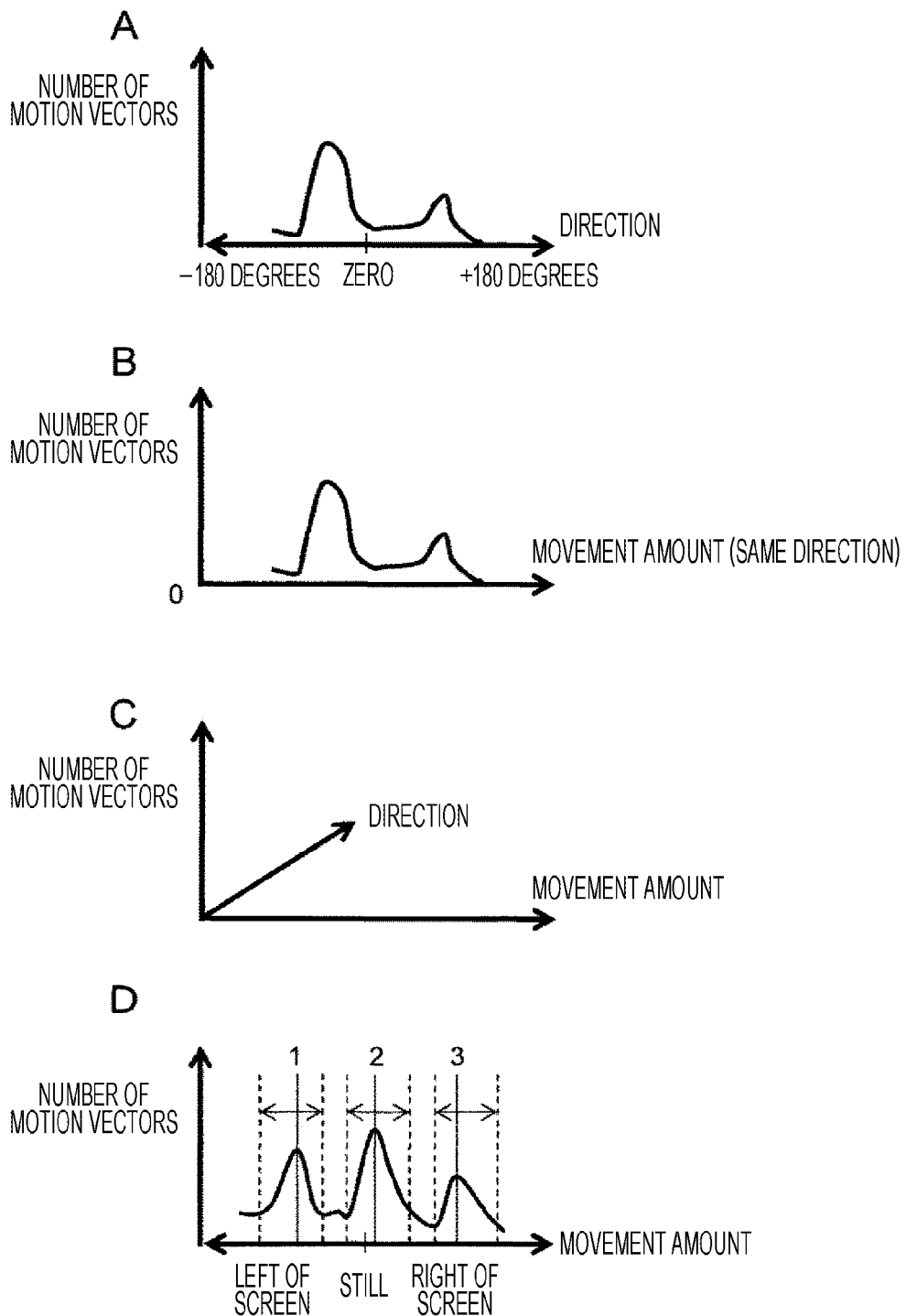
FIG. 27 is an illustrative diagram of another histogram.

The lateral axis of a histogram used for analysis of the motion vectors may be used for items other than the movement amount (speed) and the simple direction (only rightward and leftward directions) illustrated in FIG. 17. This will be described with reference to FIG. 27. First, the lateral axis of a histogram can be set to "detailed direction" illustrated in A of FIG. 27.

This histogram is preferably used in the case where the motion vectors are equal in movement amount. In addition, the lateral axis of a histogram can also be set to "only movement amount" illustrated in B of FIG. 27. This histogram is preferably used in the case where the motion vectors are equal in movement direction. Further, the lateral axis of a histogram can also be set to "direction and movement amount" illustrated in C of FIG. 27.

In the foregoing description, there are two mode values (two peaks) in the histogram as an example. However, the example is also applicable to the case where there are three or more mode values as illustrated in D of FIG. 27.

The fact that, in a histogram, the plurality of mode values is found in the distribution of directions and/or magnitudes (movement amounts) of the motion vectors means that two or more three-dimensional objects different in motion are detected in the three-dimensional area of the three-dimensional object detected by the three-dimensional object detection unit 300, and at least one of them is a moving three-dimensional object. According to the example, the at least one moving three-dimensional object can be detected earlier than at the distance-based three-dimensional object detection.

When multiple moving three-dimensional objects are detected, there is an issue of which of the moving three-dimensional objects is first subjected to pattern matching. In this case, the moving three-dimensional object closest to the subject vehicle may be subjected to pattern matching on a priority basis. The distance between each of the moving three-dimensional objects and the subject vehicle can be calculated from the movement position of the moving three-dimensional object. Alternatively, the moving three-dimensional object approaching the subject vehicle may be subjected to pattern matching on a priority basis. For example, when the traveling path of the subject vehicle is on the right-side area of the screen in the example illustrated in D of FIG. 27, the moving three-dimensional object relating to peak 3 positioned at the right end of the histogram is subjected to pattern matching on a priority basis.

Figure 28:
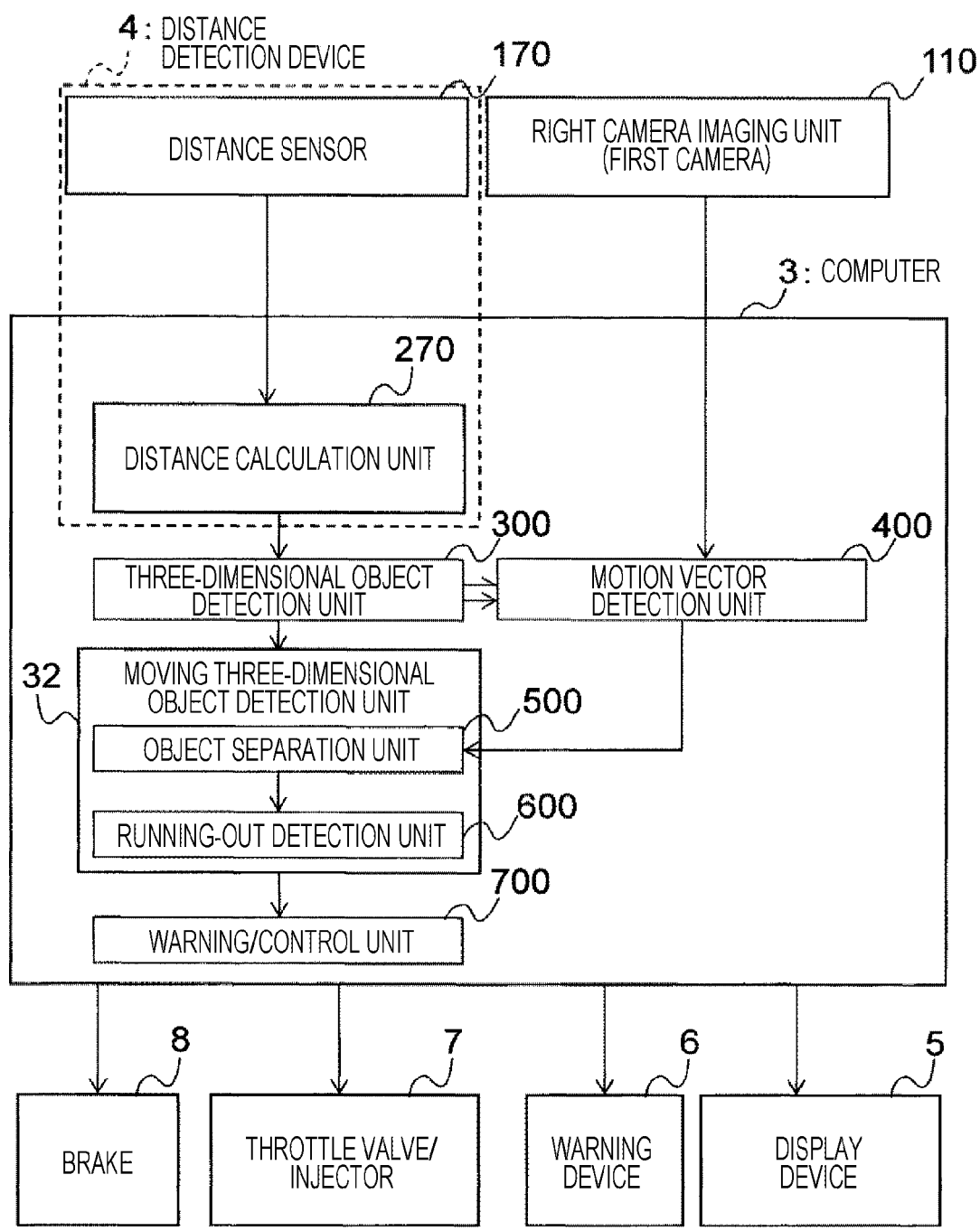
FIG. 28 is a schematic configuration diagram of another in-vehicle environment recognition device.

In the example of FIG. 1, the left camera imaging unit 100, the right camera imaging unit 110, and the parallax image generation unit 200 constitute the distance detection device 4, and the parallax image generation unit 200 generates the parallax image from the images captured by the left camera imaging unit 100 and the right camera imaging unit 110 to calculate the distance to the three-dimensional object. Alternatively, the left camera imaging unit 100 may be replaced by a distance sensor (for example, millimeter-wave radar, laser radar, or ultrasound sensor) 170 acquiring the distance from itself, and a distance calculation unit 270 formed in the computer 3 may calculate the distance to the three-dimensional object based on the output of the distance sensor 170. That is, as illustrated in FIG. 28, the distance sensor 170 and the distance calculation unit 270 may constitute the distance detection device 4. In this case, the three-dimensional object detection unit 300 detects a three-dimensional object based on the distance acquired by the distance sensor and sets a three-dimensional area in the image captured by the camera imaging unit 110, and the motion vector detection unit 400 tracks feature points in the three-dimensional area based on the moving image captured by the camera imaging unit 110. Accordingly, the same functions as those of the configuration illustrated in FIG. 1 can be performed. That is, the same advantage can also be achieved using a monocular camera instead of the stereo cameras as illustrated in FIG. 1.

The present invention is not limited to the foregoing embodiments but includes various modification examples without deviating from the gist of the present invention. For example, the present invention is not limited to the embodiments including all the components described above but includes embodiments with some of the components excluded. In addition, some of components relating to an embodiment can be added to or replaced by components relating to another embodiment.

Some or all of the foregoing components of the computer 3 and the functions and execution processes of those components may be implemented by hardware (for example, designing the logics for performing the functions in an integrated circuit). In addition, the components of the computer 3 may be implemented as programs (software) that would be read and executed by an arithmetic processing unit (for example, a CPU) to perform the functions of the components of the control device. The information relating to the programs can be stored in semiconductor memories (flash memory and SSD), magnetic storage devices (hard disc drive), recording media (magnetic disc and optical disc), and others, for example.

REFERENCE SIGNS LIST

4 distance detection device
3 computer
5 display device
6 warning device
7 throttle valve/injector
8 brake
32 moving three-dimensional object detection unit
100 right camera imaging unit
110 left camera imaging unit
115 three-dimensional area (predetermined area containing a three-dimensional object)
170 distance sensor
191 appearance area
192 shield area
200 parallax image generation unit
270 distance calculation unit
300 three-dimensional object detection unit
400 motion vector detection unit
500 object separation unit
600 running-out detection unit
700 warning/control unit

The invention claimed is:

1. A surrounding environment recognition device for a moving body, comprising:
   an imaging unit for photographing multiple images in a time series;
   a three-dimensional object detection unit for detecting a three-dimensional object on the basis of distance of the object from the imaging unit;
   a vector detection unit for tracking feature points within predetermined areas of the multiple images containing the three-dimensional object, thereby detecting motion vectors of the feature points; and
   a moving three-dimensional object detection unit for detecting a moving three-dimensional object which is present in the areas on the basis of detection results of the vector detection unit.

2. The surrounding environment recognition device for a moving body according to claim 1, wherein the moving three-dimensional object detection unit detects on the basis of the detection results of the vector detection unit that multiple three-dimensional objects are present in the areas and at least one of the multiple three-dimensional objects is a moving three-dimensional object.

3. The surrounding environment recognition device for a moving body according to claim 2, wherein the moving three-dimensional object detection unit determines that multiple three-dimensional objects are present in the areas and at least one of the multiple three-dimensional objects is a moving three-dimensional object when there are multiple mode values of direction distribution and/or magnitude distribution of the motion vectors obtained from the detection results of the vector detection unit.

4. The surrounding environment recognition device for a moving body according to claim 3, wherein
   the imaging unit is stereo cameras that include a first camera and a second camera photographing multiple images in a time series,
   the three-dimensional object detection unit detects the three-dimensional object on the basis of the distance of the object calculated from the parallax of a pair of images photographed by the stereo cameras, and
   the vector detection unit tracks feature points in the areas of the multiple images photographed by the first camera to detect motion vectors of the feature points.

5. The surrounding environment recognition device for a moving body according to claim 4, wherein the first camera is higher in imaging frame rate than the second camera.

6. The surrounding environment recognition device for a moving body according to claim 4, wherein the vector detection unit performs matching of vertical edges in the multiple images photographed by the first camera and reduced to predetermined resolutions to detect the motion vectors.

7. The surrounding environment recognition device for a moving body according to claim 4, wherein the moving three-dimensional object detection unit further performs pattern matching to determine the type of the moving three-dimensional object when the ratio of a portion of the motion vectors detected in a portion where the moving three-dimensional object appears in the areas is a predetermined threshold or more.

8. The surrounding environment recognition device for a moving body according to claim 7, wherein, in the case of performing pattern matching to determine the type of the moving three-dimensional object, the moving three-dimensional object detection unit uses only the portion where the moving three-dimensional object appears in the areas to perform pattern matching.

9. The surrounding environment recognition device for a moving body according to claim 7, wherein, in the case of performing pattern matching to determine the type of the moving three-dimensional object, the moving three-dimensional object detection unit uses only the portion where the moving three-dimensional object appears in the areas to re-calculate the position and speed of the moving three-dimensional object.

10. The surrounding environment recognition device for a moving body according to claim 7, wherein the types of three-dimensional objects determinable through pattern matching by the moving three-dimensional object detection unit include pedestrian, two-wheel vehicle, and animal.

11. The surrounding environment recognition device for a moving body according to claim 10, wherein the moving three-dimensional object detection unit assumes that the type of the moving three-dimensional object is pedestrian, calculates the percentage of entire body of the pedestrian corresponds to the portion where the moving three-dimensional object appears in the areas, and performs pattern matching to determine the type of the moving three-dimensional object when the calculated value exceeds a threshold and the portion of the moving three-dimensional object appearing in the areas includes a portion presumed to be a head portion or a leg portion.

12. The surrounding environment recognition device for a moving body according to claim 1, further comprising a distance sensor for acquiring a distance from the distance sensor, wherein
   the three-dimensional object detection unit detects a three-dimensional object on the basis of the distance acquired by the distance sensor.

13. A surrounding environment recognition device, comprising:
   an imaging unit for photographing multiple images in a time series;
   a three-dimensional object detection unit for detecting a three-dimensional object on the basis of a distance of the object from the imaging unit;
   a vector detection unit for tracking feature points within the areas of the multiple images, thereby detecting motion vectors of the feature points; and
   a moving three-dimensional object detection unit for detecting a moving three-dimensional object which is present in the areas on the basis of detection results of the vector detection unit.

* * * * *